(12) United States Patent
Travers et al.

(10) Patent No.: US 12,496,443 B2
(45) Date of Patent: Dec. 16, 2025

(54) APPARATUS AND METHOD FOR IMPROVING ELECTRIC FIELD THERAPY TO REDUCE SOLID TUMORS

(71) Applicant: LifeBridge Innovations, PBC, Longwood, FL (US)

(72) Inventors: Peter F. Travers, Longwood, FL (US); Richard Rotondo, Oviedo, FL (US); Scott Krywick, Lake Mary, FL (US); Nathaniel R. Travers, Longwood, FL (US); Ken Watkins, Lake Mary, FL (US)

(73) Assignee: LifeBridge Innovations, PBC, Longwood, FL (US)

( * ) Notice: Subject to any disclaimer, the term of this patent is extended or adjusted under 35 U.S.C. 154(b) by 332 days.

(21) Appl. No.: 17/846,272

(22) Filed: Jun. 22, 2022

(65) Prior Publication Data

US 2022/0401726 A1 Dec. 22, 2022

Related U.S. Application Data

(60) Provisional application No. 63/213,550, filed on Jun. 22, 2021.

(51) Int. Cl.
*A61N 1/36* (2006.01)
*A61N 1/04* (2006.01)
*A61N 1/40* (2006.01)
*G16H 20/40* (2018.01)

(52) U.S. Cl.
CPC ....... *A61N 1/36002* (2017.08); *A61N 1/0476* (2013.01); *A61N 1/40* (2013.01); *G16H 20/40* (2018.01)

(58) Field of Classification Search
None
See application file for complete search history.

(56) References Cited

U.S. PATENT DOCUMENTS

| | | |
|---|---|---|
| 7,890,183 B2 | 2/2011 | Palti et al. |
| 8,019,414 B2 | 9/2011 | Palti |
| 8,175,698 B2 | 5/2012 | Palti et al. |
| 2002/0058933 A1 | 5/2002 | Christopherson et al. |
| 2017/0360300 A1 | 12/2017 | Rossi et al. |
| 2019/0117963 A1* | 4/2019 | Travers ............... A61N 1/0476 |
| 2020/0155835 A1* | 5/2020 | Wasserman ......... A61N 1/0476 |
| 2020/0171297 A1 | 6/2020 | Kirson et al. |

(Continued)

OTHER PUBLICATIONS

Notification of the Transmittal of the International Search Report and the Written Opinion of the International Searching Authority, or the Declaration dated Oct. 24, 2022 for International Application No. PCT/US2022/034439 (9 pages).

*Primary Examiner* — Michael W Kahelin
(74) *Attorney, Agent, or Firm* — TAYLOR & EDELSTEIN, PC

(57) ABSTRACT

A method of treating tumors by the delivery of tumor treating electric fields to a patient. The method including the steps of placing an electrode array on the patient; running a temperature analysis mode of the electrode array to provide a temperature analysis; determining which subarrays of the electrode array have neutral non tumor treating field firings inserted into a firing configuration based on the temperature analysis; and treating the patient using the firing configuration to deliver tumor treating fields to the patient.

9 Claims, 23 Drawing Sheets

(56) References Cited

U.S. PATENT DOCUMENTS

2020/0330758 A1* 10/2020 Schmidt ............... A61N 5/0601
2021/0069180 A1    3/2021 Marshall-Gradisnik et al.
2021/0177492 A1*  6/2021 Travers ................ A61N 1/0476
2021/0196967 A1*  7/2021 Carlson ................ A61N 1/0476
2022/0305277 A1*  9/2022 Shamir ............. A61N 1/36002

* cited by examiner

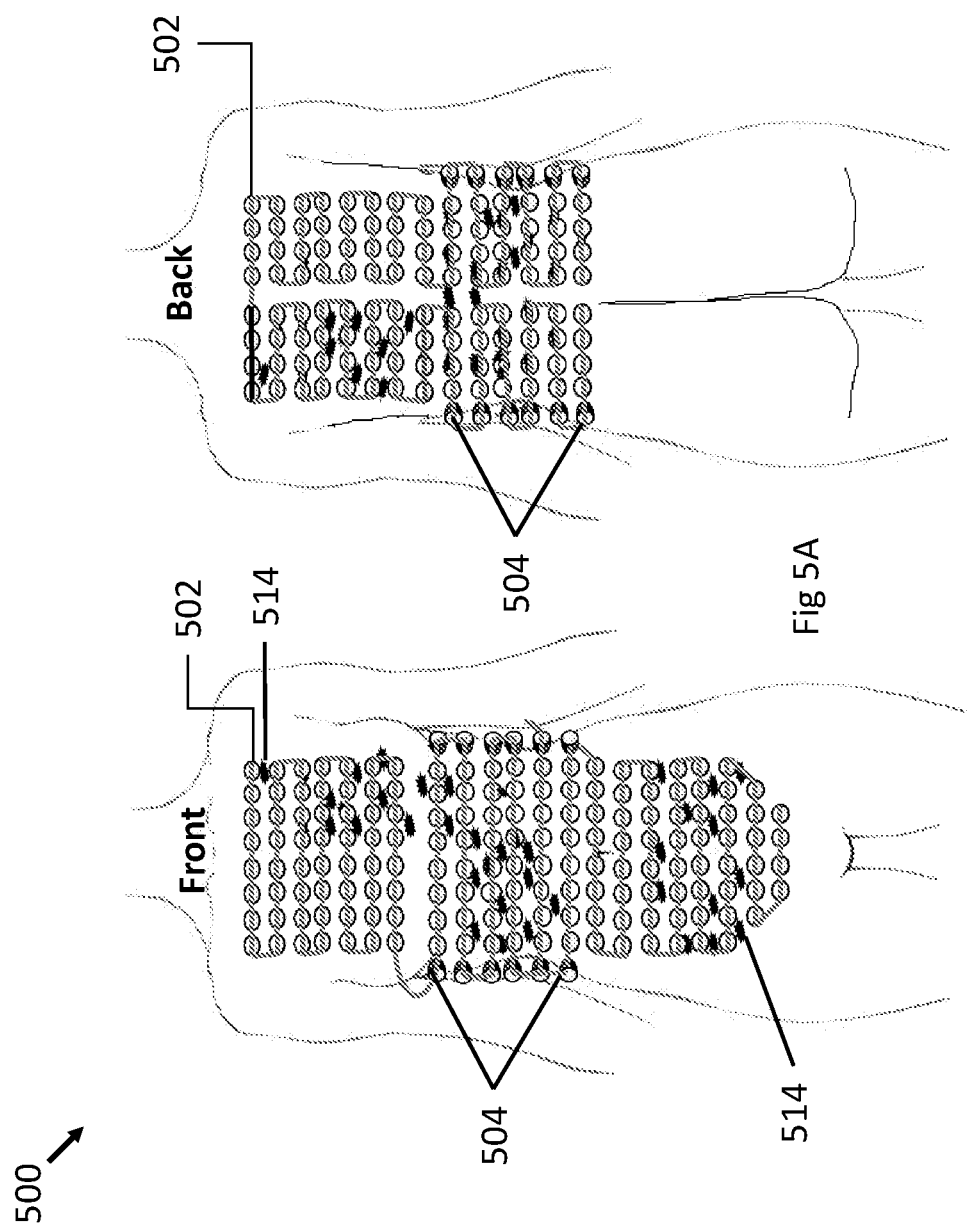

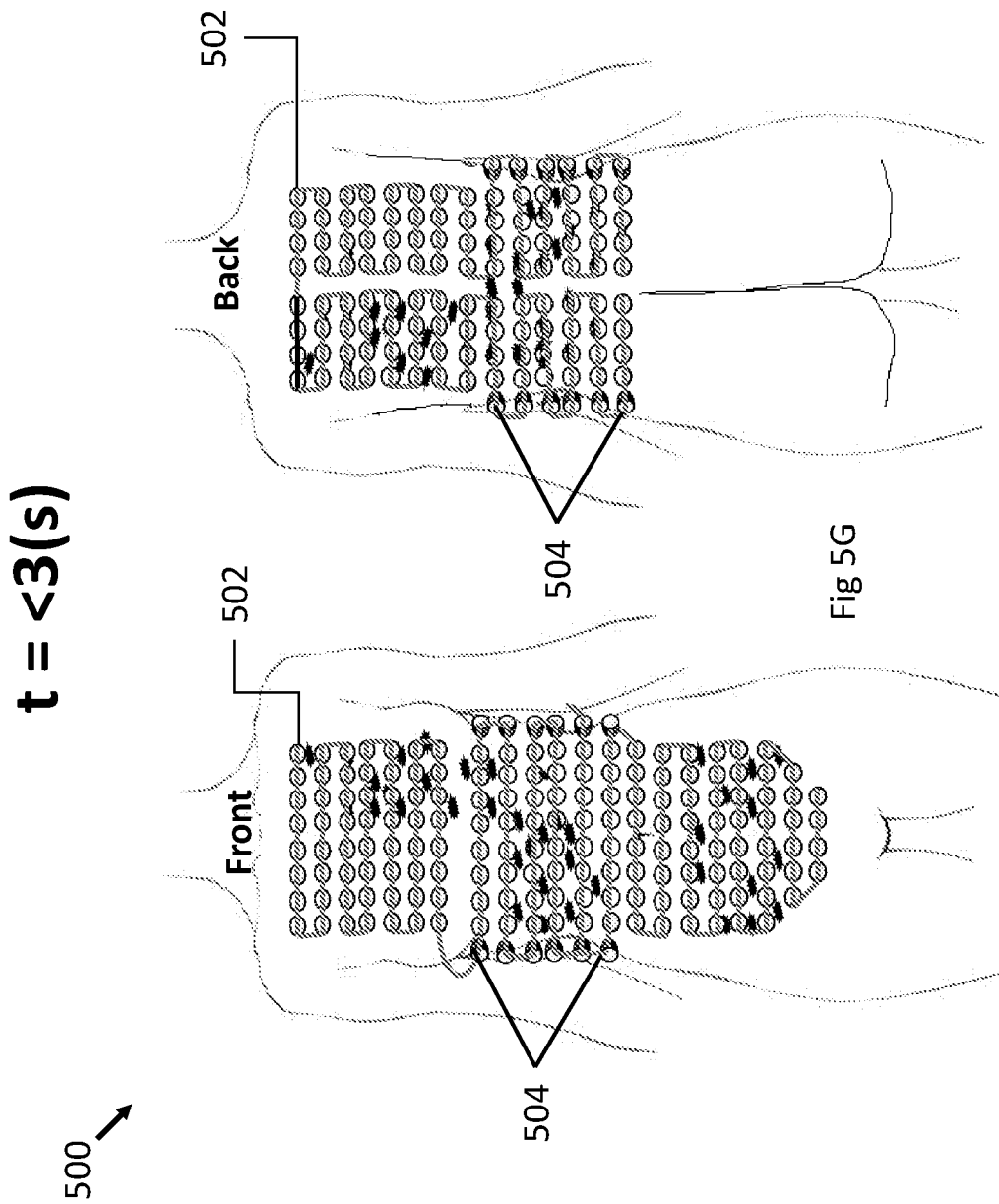

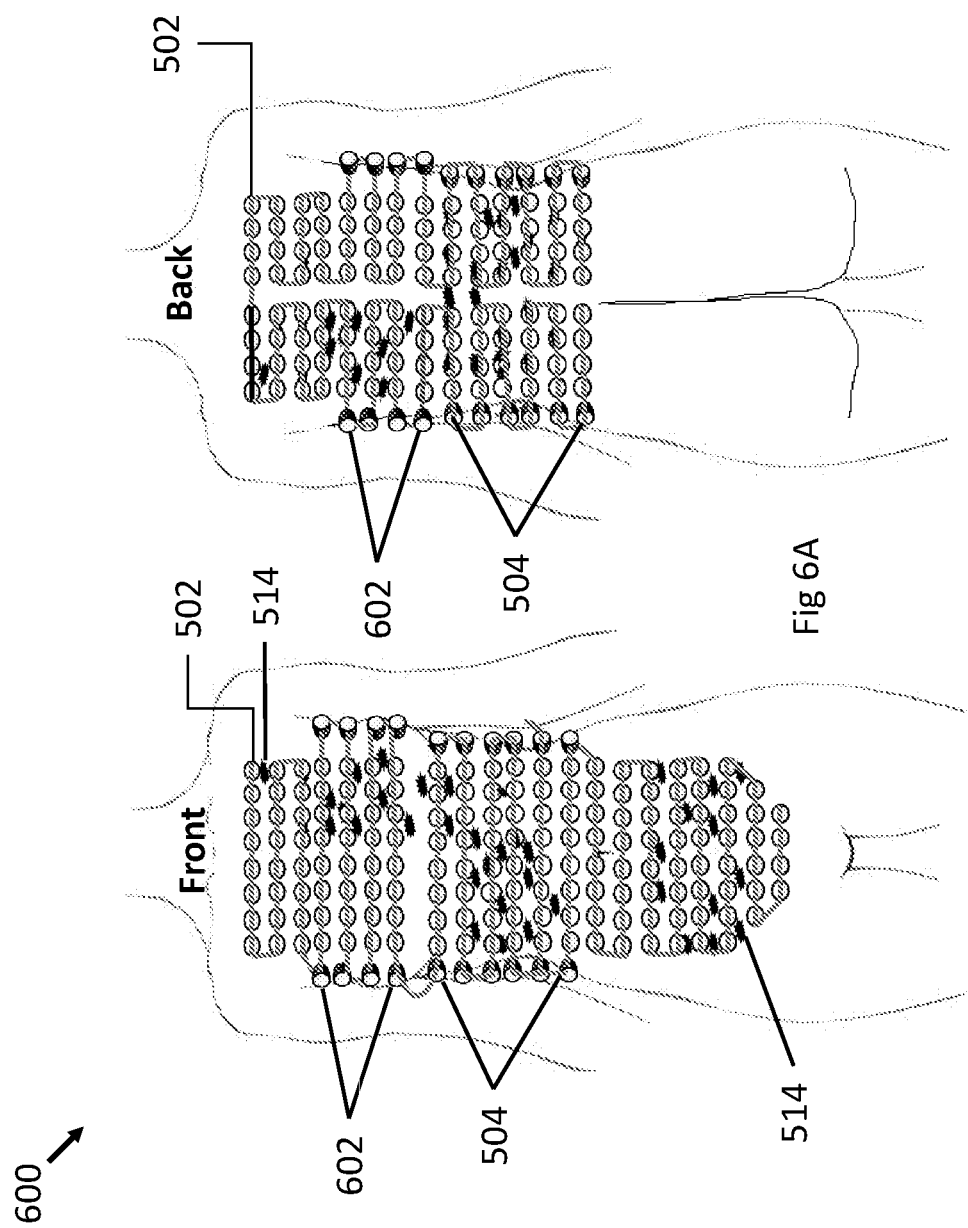

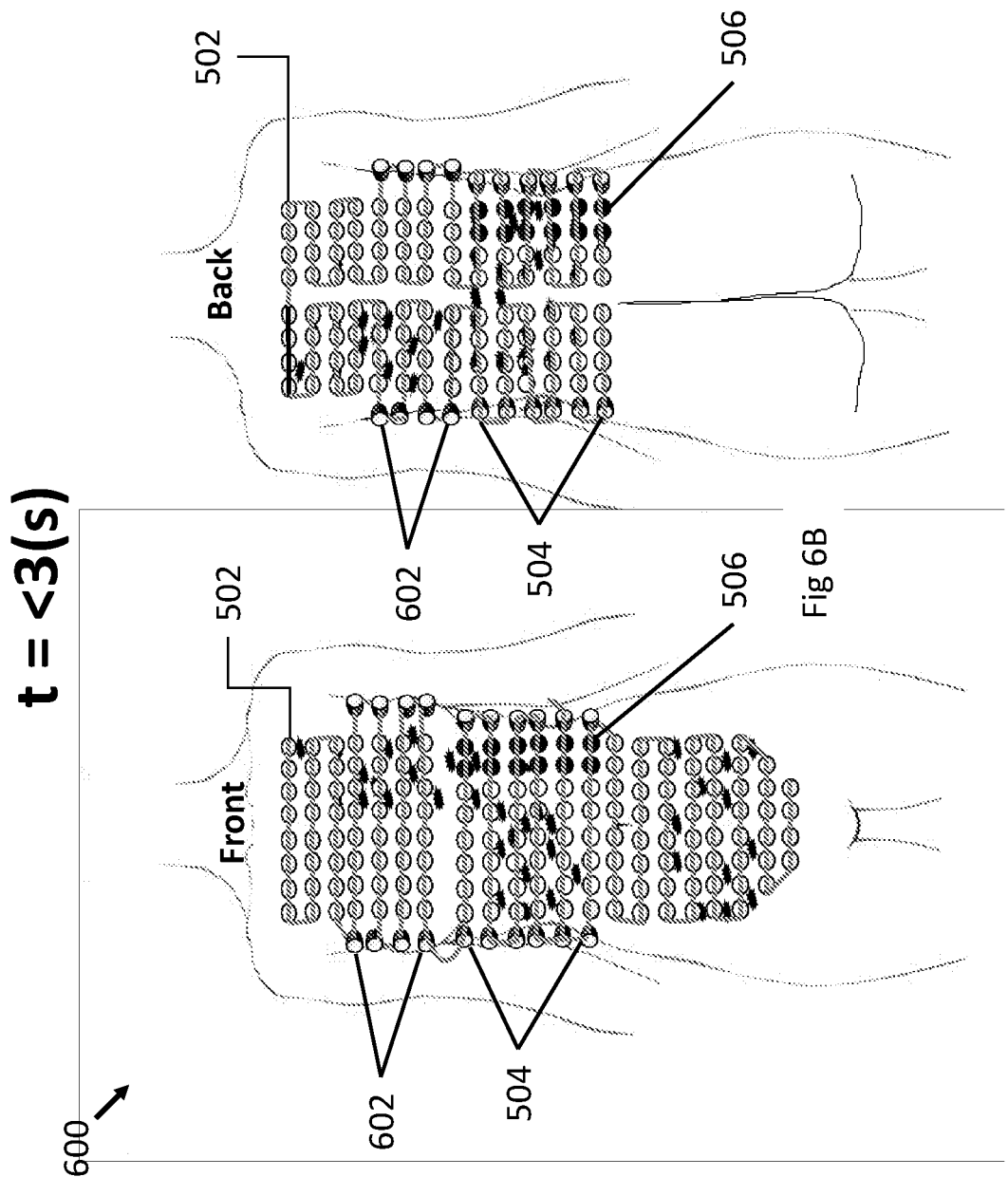

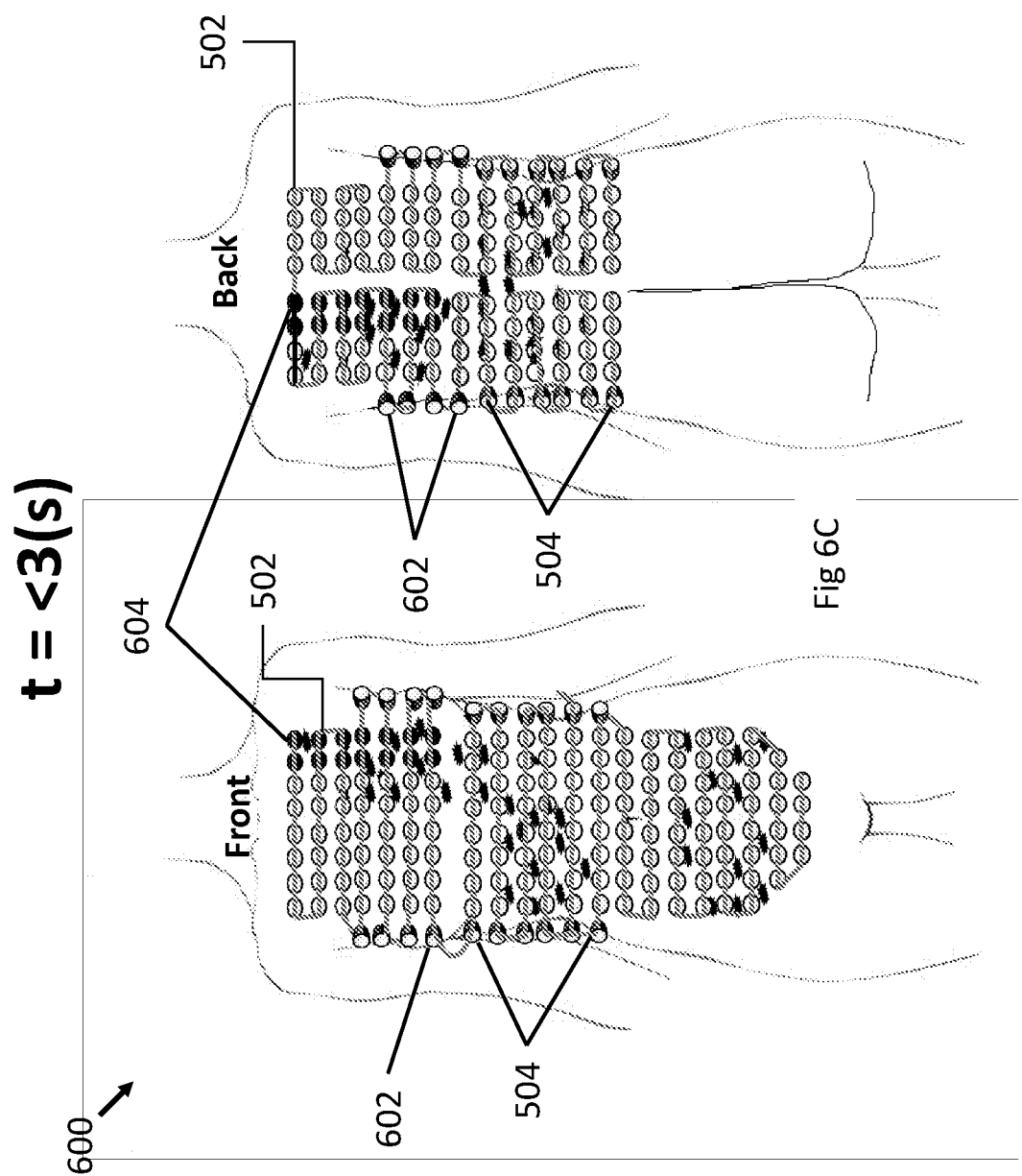

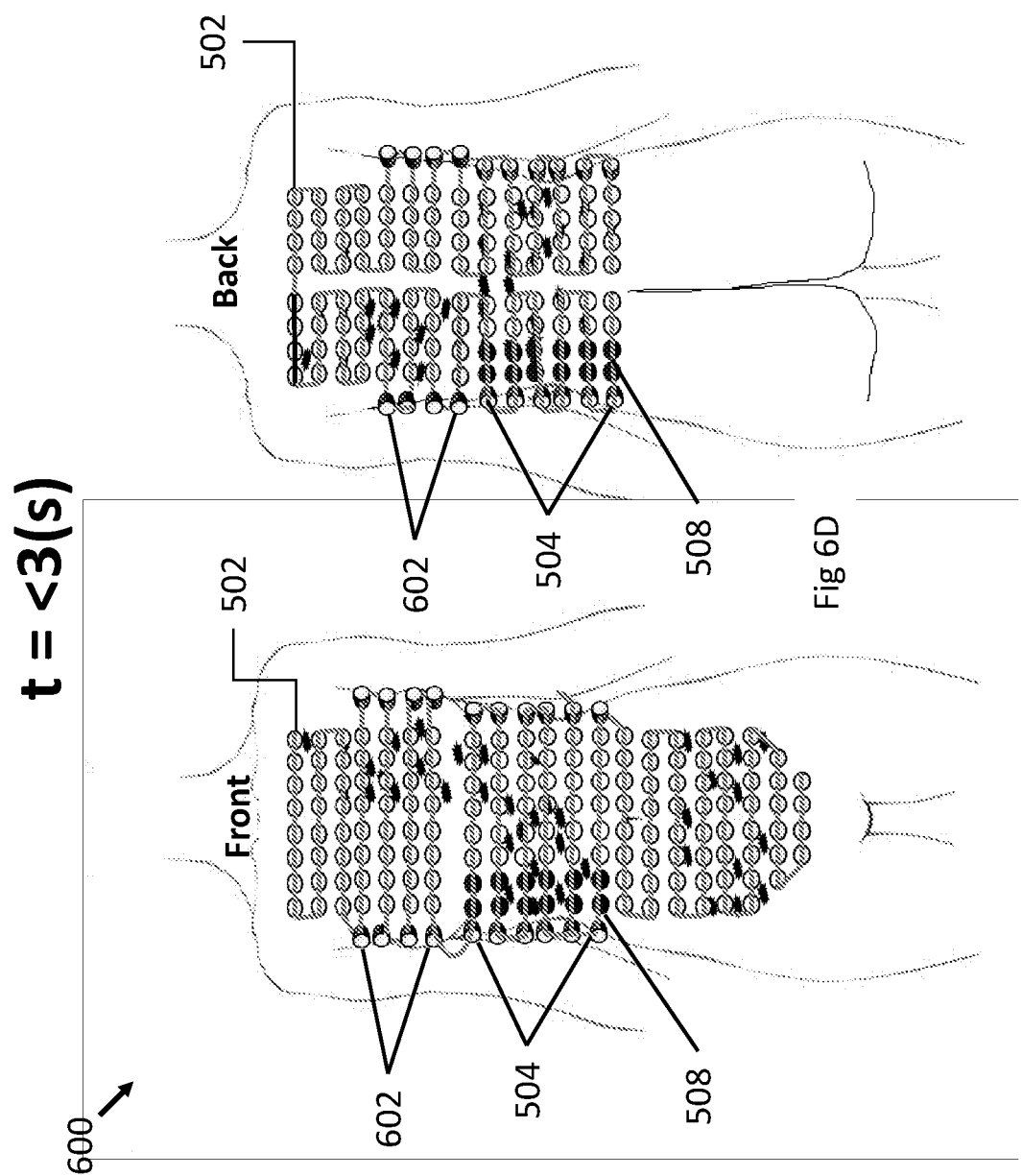

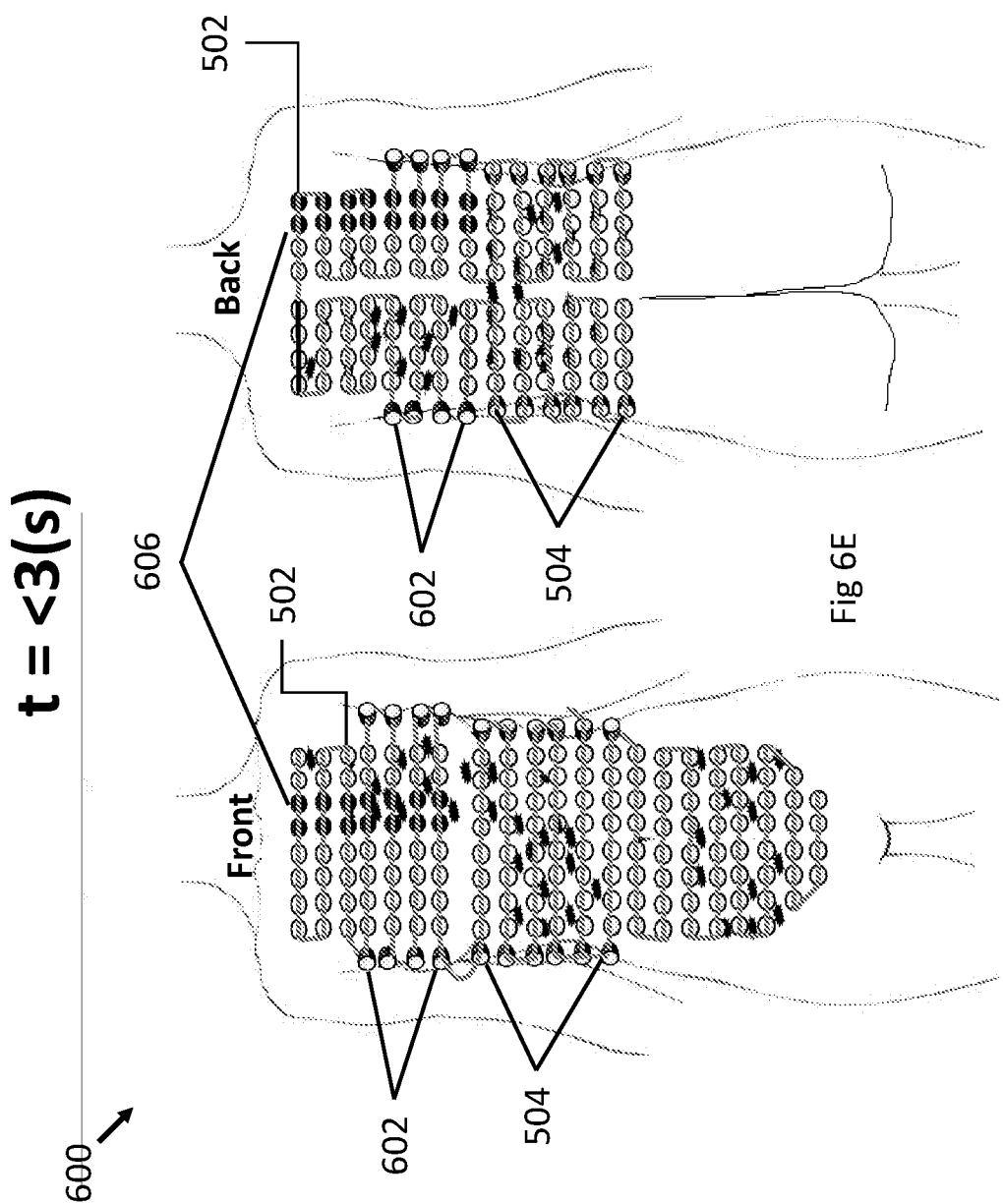

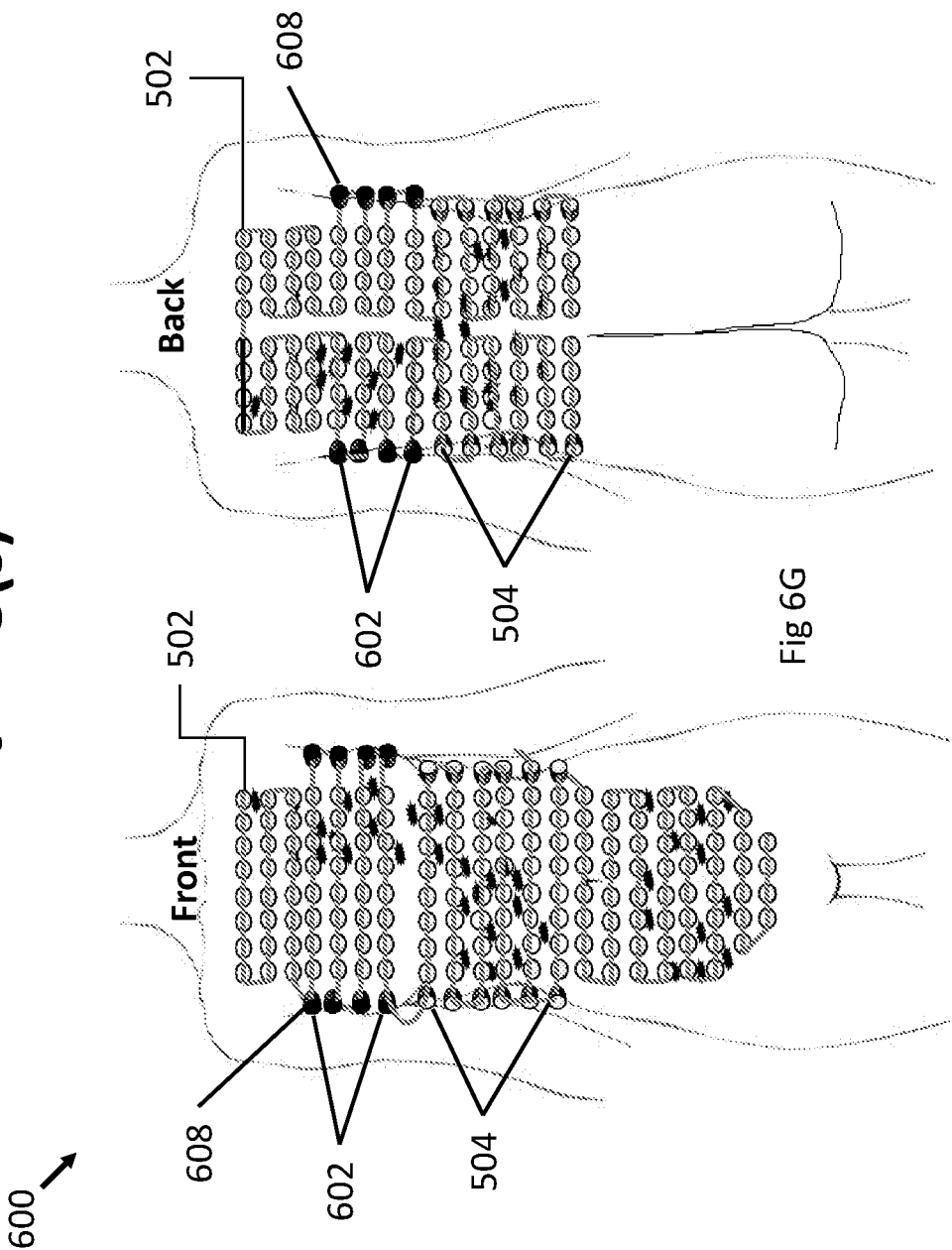

APPARATUS AND METHOD FOR IMPROVING ELECTRIC FIELD THERAPY TO REDUCE SOLID TUMORS

CROSS REFERENCE TO RELATED APPLICATIONS

This is a non-provisional patent application based upon U.S. provisional patent application Ser. No. 63/213,550, entitled "APPARATUS AND METHOD FOR IMPROVING ELECTRIC FIELD THERAPY TO REDUCE SOLID TUMORS BY INTRODUCING PREEMPTIVE HEAT MANAGEMENT", filed Jun. 22, 2021.

BACKGROUND OF THE INVENTION

1. Field of the Invention

The present invention relates to tumor and cancer cell treatment and more specifically to treatments involving the application of electromagnetic fields.

2. Description of the Related Art

Alternating Electric Fields, also referred to as Tumor Treating Fields (TTFs or TTFields), can be employed as a type of cancer treatment therapy by using low-intensity electromagnetic fields. These low-intensity fields rapidly change direction, thousands of times per second. Since the TTFs are electric fields, they do not cause muscle twitching or severe adverse side effects on other electrically activated tissues. The growth rate of cancer cells is typically greater than the growth rate of normal, healthy cells. Alternating Electric Fields therapy takes advantage of this high growth-rate characteristic. TTFs act to disrupt a cancer cell's mitotic process and cytokinesis by manipulating the cell's polarizable intracellular constituents, namely tubulins that form mitotic spindles that pull the genetic material in the nucleus into two sister cells. Tubulins form mitotic spindles by taking on electrical properties called dipole moments, that is tubulin molecules become positively charged on one side and negatively charged on the other side. Tubulin form mitotic spindles by connecting to each other positive to negative forming chains. TTFs interrupt mitotic spindle microtubule assembly by interfering with the electric bonds between tubulin molecules thereby preventing cell division. The metastatic disease cells treated using TTFs will go into programmed cell death usually within 4 to 5 hours. Those cancer cells that do manage to divide create malformed daughter cells that are recognized by the immune system as foreign and are thereby attacked. The result is a significant reduction in tumor size and potential for full elimination of solid tumors. TTFs are tuned to treat specific cancer cells and thereby do not damage normal cells. TTF therapy can be used as a sole treatment method, or it can be combined with conventional drug delivery mechanisms.

TTFs are applied to patients using insulated electrodes adhered to the skin by a variety of methods including the use of medical adhesives, articles of clothing, etc. There are multiple configurations of insulated electrodes, but all have an insulated material with a high dielectric constant on one side and a thin metal coating on the other, usually silver. Prior art insulated electrodes used to generate TTFs always come in pairs.

It is well established that delivering TTF therapy from more than one angle increases tumor reduction. This is because of a phenomenon called dielectrophoresis. During the telophase of mitosis, a cleavage furrow forms between the emerging daughter cells. When a TTField runs parallel through the cleavage furrow Polarizable objects are pulled toward the highest concentration of electric field (now the cleavage furrow), in this case, the genetic material needed for cell division. This bulk of material packing the cleavage furrow causes it to burst, causing cell death. This bursting of targeted cancer cells leads to increased tumor reduction in addition to the base mechanism of action of TTFs. Since cancer cells divide in random positions and orientations a TTF from one direction miss opportunities to cause dielectrophoresis. Prior art TTF systems use fixed arrays that presently only deliver therapy from 2 angles.

The success of TTF therapy is also dependent on intensity. TTFields of 1V/cm may slow a tumor down but still leave more cells growing than are being killed. However, intensities producing TTFields of 2.35V/cm kill more cells than grow, potentially fully defeating a Tumor. The problem that intensity brings to successful TTF therapy is heat management. Prior art reacts to rising temperatures caused by increased intensity by shutting down the entire TTF system for cool down periods when array temperatures reach 105.5 F. This reactive approach to heat management has been observed to only deliver therapy to a Patient 39% of the time the device is being worn in some cases. These extended shutdowns reduce the efficacy of TTF therapy.

What is needed in the art, is a TTF system that adds angles to the field directions to significantly increases tumor reduction, producing increased angles of delivery and lower duty cycles for array elements, preventing array heat buildup, and manage variables that lead to heat generation during therapy, such as size of the patient (large, small, fat, slim, etc.), patient clothing, ambient temperature, changes in posture (sitting, sleeping, etc.).

SUMMARY OF THE INVENTION

The present invention provides an improved cancer and tumor treatment regime utilizing TTF therapy.

The invention in one form is directed to a method of treating tumors by the delivery of tumor treating electric fields to a patient. The method including the steps of placing an electrode array on the patient; running a temperature analysis mode of the electrode array to provide a temperature analysis; determining which subarrays of the electrode array have neutral non tumor treating field firings inserted into a firing configuration based on the temperature analysis; and treating the patient using the firing configuration to deliver tumor treating fields to the patient.

The invention in another form is directed to a method of treating tumors by the delivery of tumor treating electric fields to a patient including the steps of: placing a virtual electrode array on a patient phantom; running a virtual temperature analysis of the virtual electrode array to provide a temperature analysis; determining which subarrays of the virtual electrode array have neutral non tumor treating field firings and/or redirected neutral tumor treating field firings inserted into a firing configuration based on the temperature analysis; and treating the patient using the firing configuration to deliver tumor treating fields to the patient.

The invention is yet another form is directed to a method of treating tumors by the delivery of tumor treating electric fields to a patient including the steps of: importing a medical image of the patient into a medical simulator; placing a virtual electrode array on a patient phantom of the simulator; running a virtual temperature analysis of the virtual electrode array to provide a temperature analysis; determining which subarrays of the virtual electrode array have neutral non tumor treating field firings and/or redirected neutral tumor treating field firings inserted into a firing configuration based on the temperature analysis; applying an electrode array to the patient; and treating the patient using the firing configuration to deliver tumor treating fields to the patient.

Advantageously the present invention controls the temperature of electrodes in a tumor treating field device in a preemptive manner using temperature analysis to determine a firing configuration of subarrays of the electrode array.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 5A illustrates one manner in which the present inventions electrodes are positioned on a torso of the patient ready for assignments into sub arrays;

FIG. 5G illustrates a NNTTF of less than 3 seconds. No array elements are activated;

FIG. 6A illustrates one manner in which the present inventions electrodes are positioned on a torso of the patient ready for assignments into sub arrays;

FIG. 6B illustrates a diagonal subarray pair firing left front to right back for less than 3 seconds;

FIG. 6C illustrates a RNTTF in the form of a diagonal subarray pair firing through the left lung, left front to mid right back, for less than 3 seconds;

FIG. 6D illustrates a diagonal subarray pair firing right front to left back for less than 3 seconds;

FIG. 6E illustrates a RNTTF in the form of a diagonal subarray pair firing through the left lung, med right front to right back, for less than 3 seconds;

FIG. 6G illustrates a RNTTF in the form of a side to side subarray pair firing for less than 3 seconds;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1A:
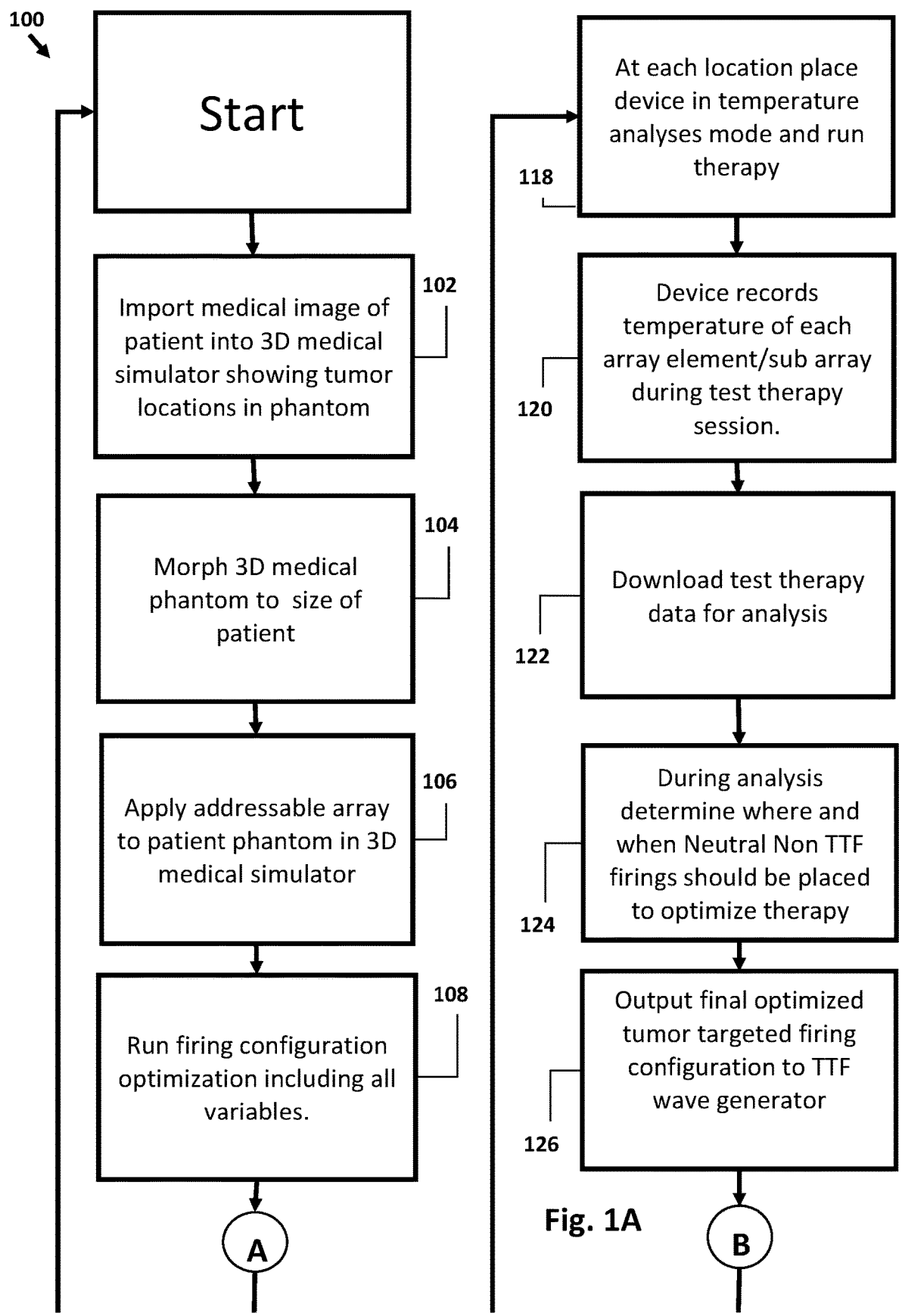
FIG. 1A is the first page of a flowchart illustrating an embodiment of a treatment method of the present invention introducing the implementation of Neutral Non TTFs (NNTTFs)
Figure 1B:
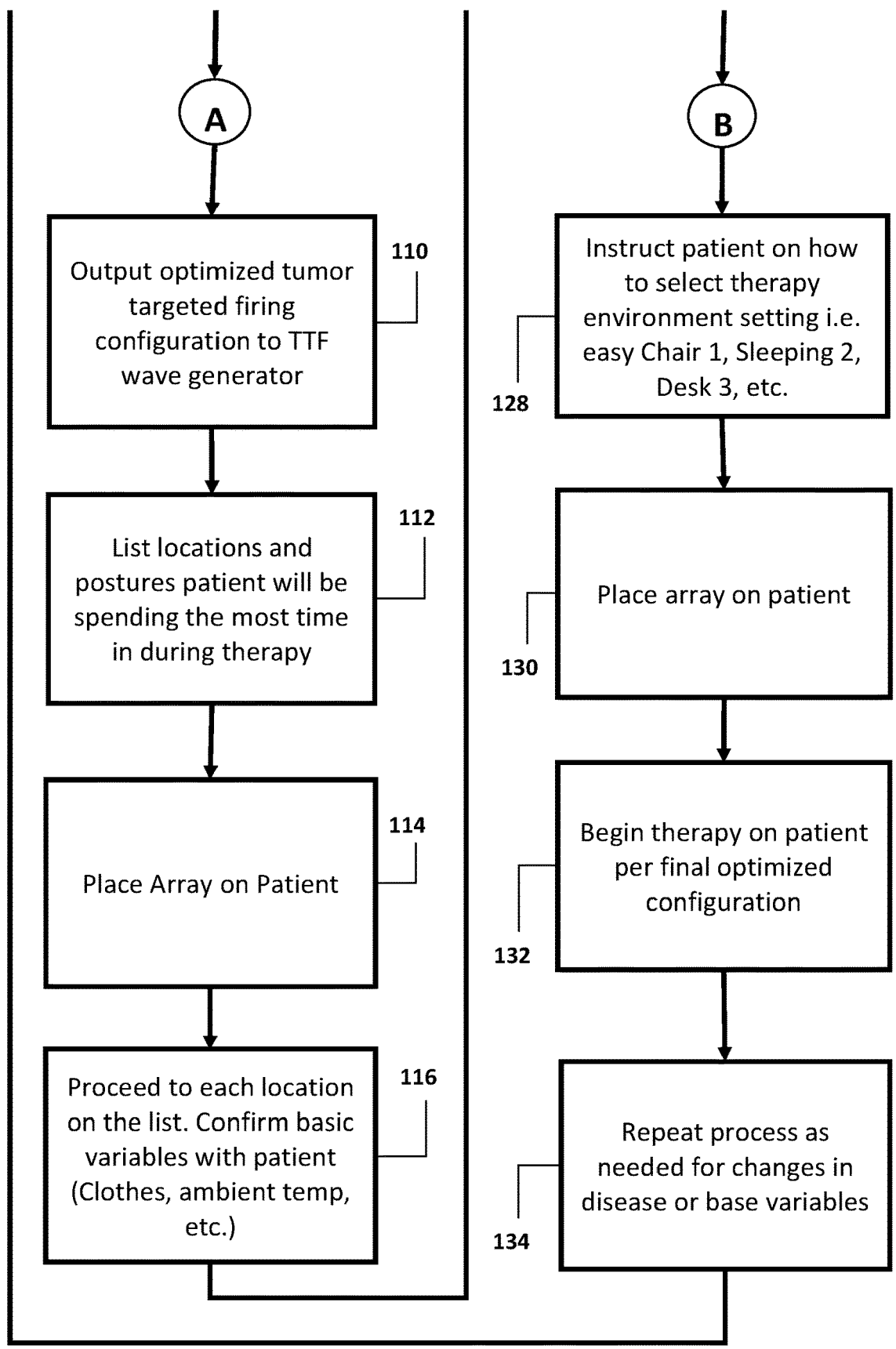
FIG. 1B is the second page of the flowchart of FIG. 1A.

Referring to the drawings and more particularly to FIGS. 1A and 1B there is illustrated an embodiment of a treatment method 100 of the present invention for preparing to treat a patient. One important step in administering tumor treating fields (TTF) is positioning electric fields to target multiple tumors in the human body. The present invention uses a process for optimizing the placement of array elements on the body as well as an optimal firing sequence for the array elements, to take advantage of the placement of the elements. First, at step 102, a medical image of tumor locations in a patient is imported into a medical simulator such as Sim4life. Such medical simulators have phantoms or avatars that meet general body types of most of the population. The phantoms are 3-D bodies with all tissue types and organs simulating the human anatomy. An appropriate 3-D phantom is selected to match the size of the patient. The phantom is further morphed to match the physical size/shape of the patient, at step 104. Within the medical simulator a representation of the present invention is placed on the phantom, at step 106. This completes preparation for a medical simulation with the phantom accurately representing the location of the patients' tumors and the present inventions electrical attributes e.g., dielectric constant, power levels, etc. At step 108, a simulated firing algorithm is run, analyzing which sequence or combination of array elements optimally treats the tumors in the simulation. The positioning of the array elements are adjusted by the system to enhance the TTF treatment of the applied electromagnetic fields. The behavior of electric fields from the TTF is simulated through the body tissues and organs to evaluate the effectiveness of the applied electromagnetic fields and to optimize the firing sequences. This includes the optimum number of sub array pairs, number of different angles they fire from and power levels. The results of the optimal firing sequence are then exported to the wave generator, at step 110. At step 112 the patient's daily habits are discovered through an interview. Those locations where a patient will be spending the most time while under therapy are identified and listed, e.g., easy chair, sleeping, work desk, etc. At step 114, the present invention is placed on the patient in the manner recommended by the medical simulation process and/or the doctor's input. At step 116, the process of proceeding to each therapy location is begun. At each location basic variables related to the environment, such as temperature are gathered and recorded, e.g., likely clothing worn, ambient temperature, posture, air flow, etc. Step 118 requires going to each therapy location, placing the device in environmental (or temperature) analysis mode and running a therapy session. At step 120, an environmental or temperature test therapy session is undertaken, with the device recording the temperature of each array element and its sub array. The data from each test therapy session is downloaded for analysis, at step 122. During the environmental analysis (step 124) a determination of when to insert Neutral Non TTFs (NNTTFs) into the firing sequence is determined to prevent or moderate temperature build up and optimize therapy. This is done for each therapy location for each patient. The optimized firing configuration with NNTTFs is downloaded into the patient's wave generator, at step 126. The patient is instructed, at step 128, on how to select the therapy environment setting, e.g., press 1 for easy chair, press 2 for sleeping, press 3 for sitting at desk, etc. The master array is then placed on the patient at step 130 and the patient begins personalized optimal therapy 132. When needed the process is repeated (step 134) for changes in body shape due to weight changes, swelling or other physical body changes, the development of new tumors or the decline of existing tumors or changes in environment.

The use of the phrase "environmental analysis" herein is considered to include "temperature analysis" and includes other factors that play into the analysis, such as array size, array shape, firing angle, duty cycle, voltage used, patient body size/shape, patient activity/movement, ambient temperature, ambient airflow, obstructions on the body of the patient or proximate to the patient, thermal radiation, and/or active cooling.

Array size is considered since generally larger arrays use less current per electrode with less heat generated per electrode. Conversely, smaller arrays may result in a more current being supplied to each electrode that can result in a higher concentration of heat per electrode. The array shape, geometry and/or layout results in establishing the electromagnetic paths through the body and the tumors, which will influence the power needed to be delivered to individual electrodes and hence the heat and resulting temperature is influenced. The firing angle changes the electromagnetic field path through the body and can increase, or decrease the power delivered to each electrode. And, of course the duty cycle assigned to electrode pairs will influence the power delivered and potential temperature rise.

Further elements considered in the environmental analysis is the voltage levels used in the electrode pairs, generally a higher voltage results in more heat, and a lower voltage results in less heat. The patient size/shape and thermal tolerance are part of the analysis. The patients' movement during treatment is also considered, such as if the patient is relatively static (limited movement such as sleep, sitting, tumor in a more static area i.e. liver, etc.) or relatively dynamic (position changes, inflated lung vs deflated lung, hydration level changes, weight loss, etc.). Ambient temperature, which may be relatively static such as in a temperature controlled room, or relatively dynamic such as in an outdoor space. Ambient airflow is also considered, such as direct flow, such as from a fan, or indirect flow, such as a breeze. Obstructions that will be consistently close to the body, such as clothing, and those that may be intermittently close, such as a bed or chair. The analysis also considers the presence of thermal radiation, such as from the sun, and the presence of active cooling, such as a chill bed, directional cooling, or even cooling delivered by cooling tubes associated with the wire extending to the electrodes.

Figure 5B:
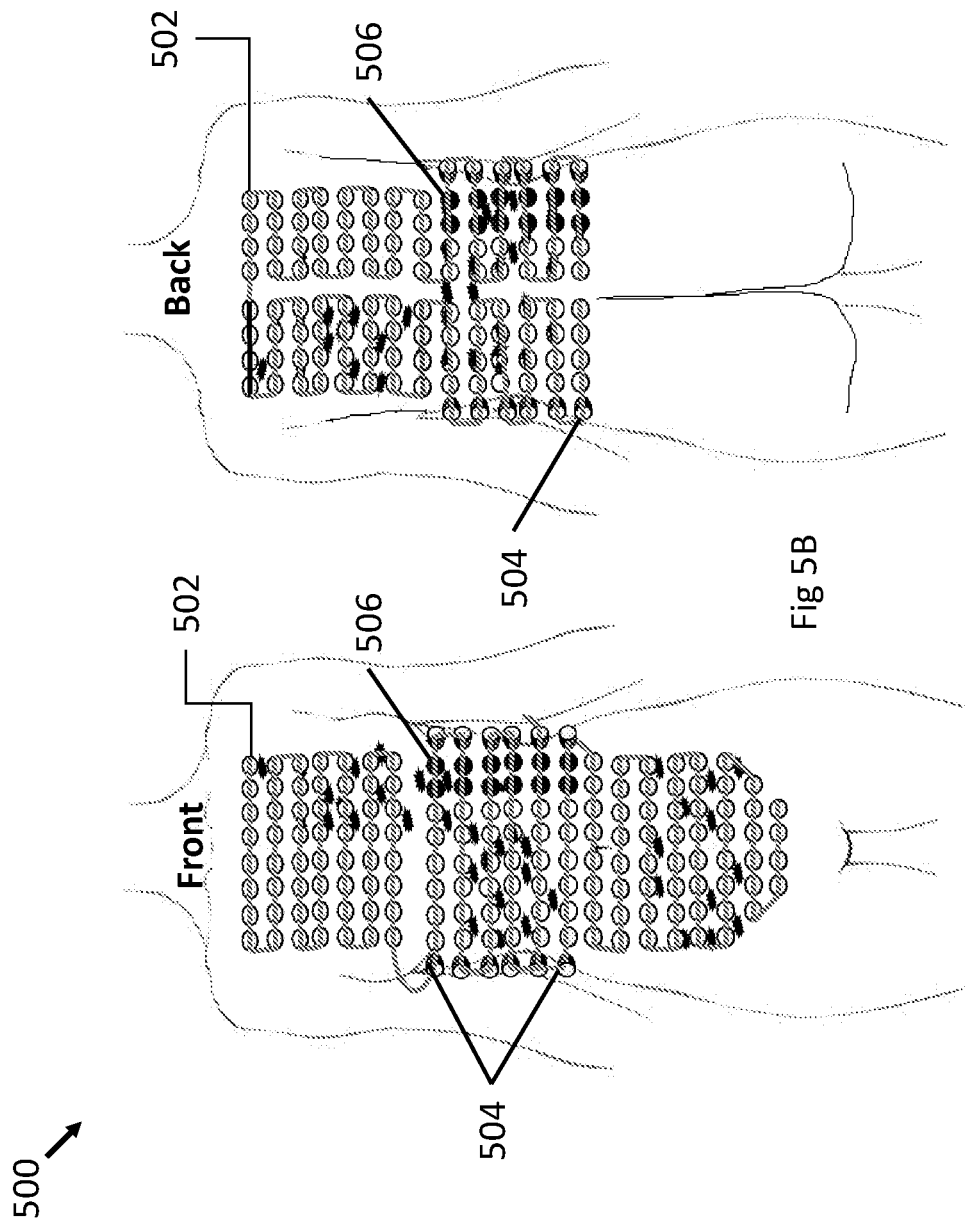
FIG. 5B illustrates a diagonal subarray pair firing left front to right back.
Figure 5C:
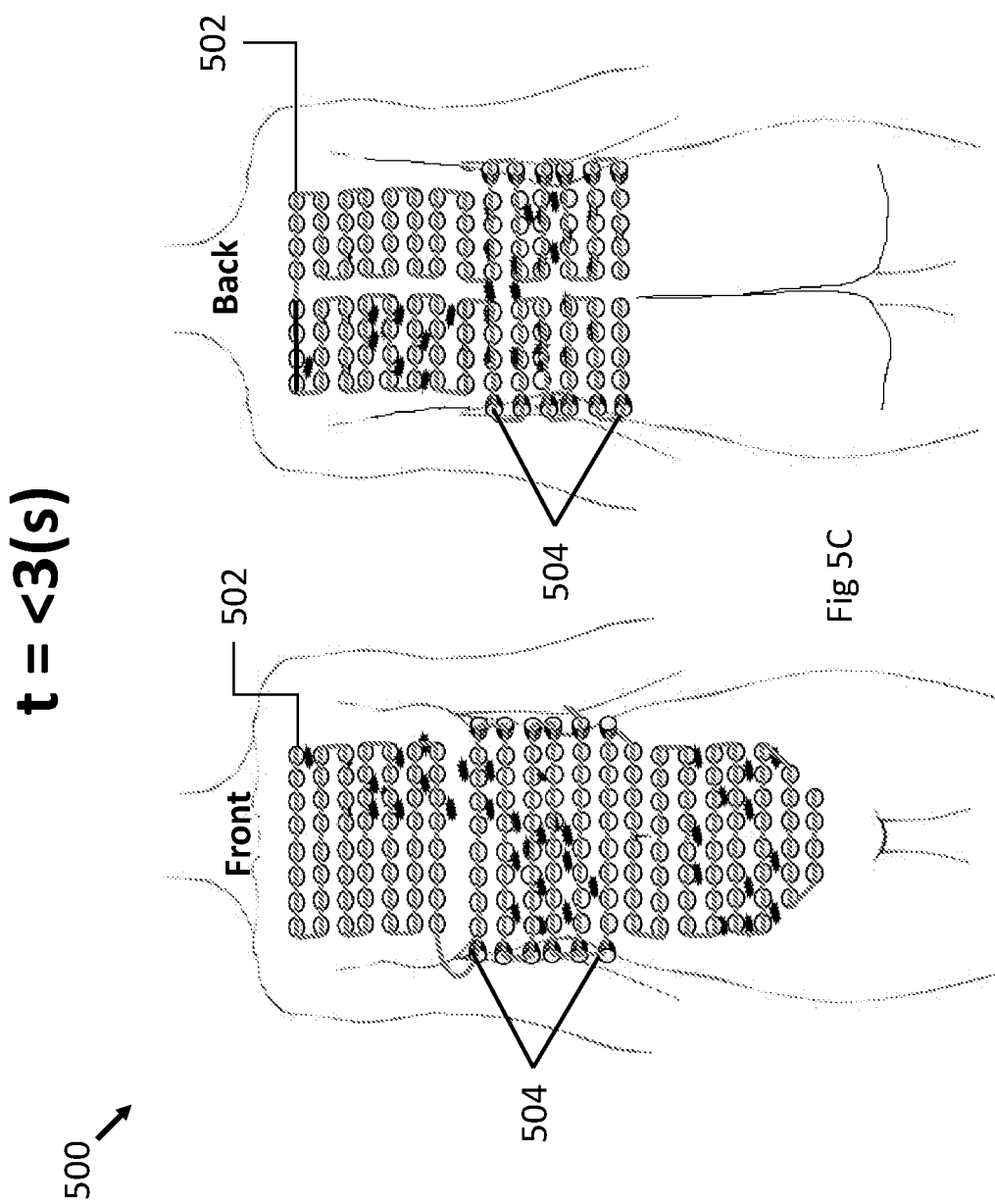
FIG. 5C illustrates a NNTTF of less than 3 seconds. No array elements are activated.
Figure 5D:
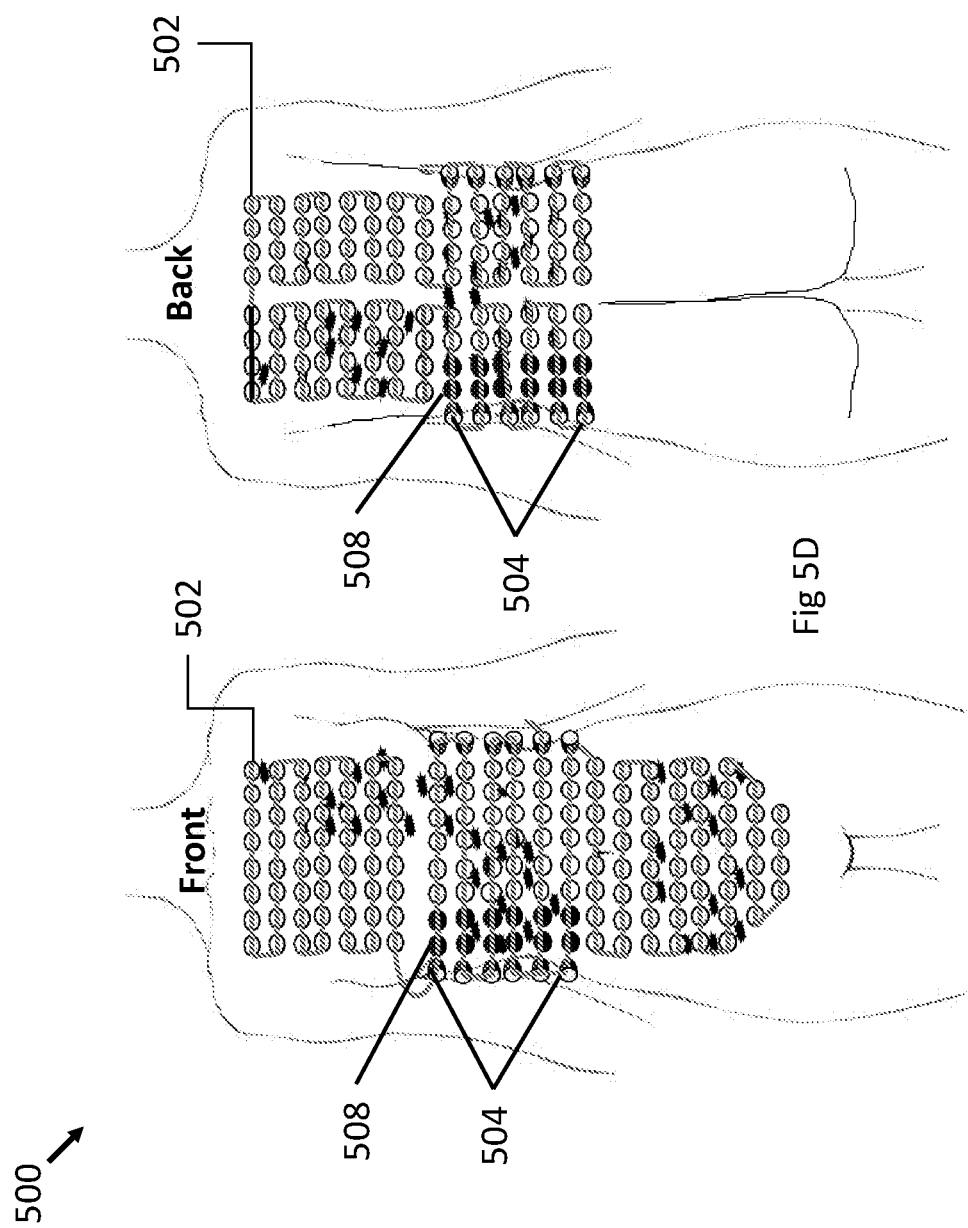
FIG. 5D illustrates a diagonal subarray pair firing right front to left back.
Figure 5E:
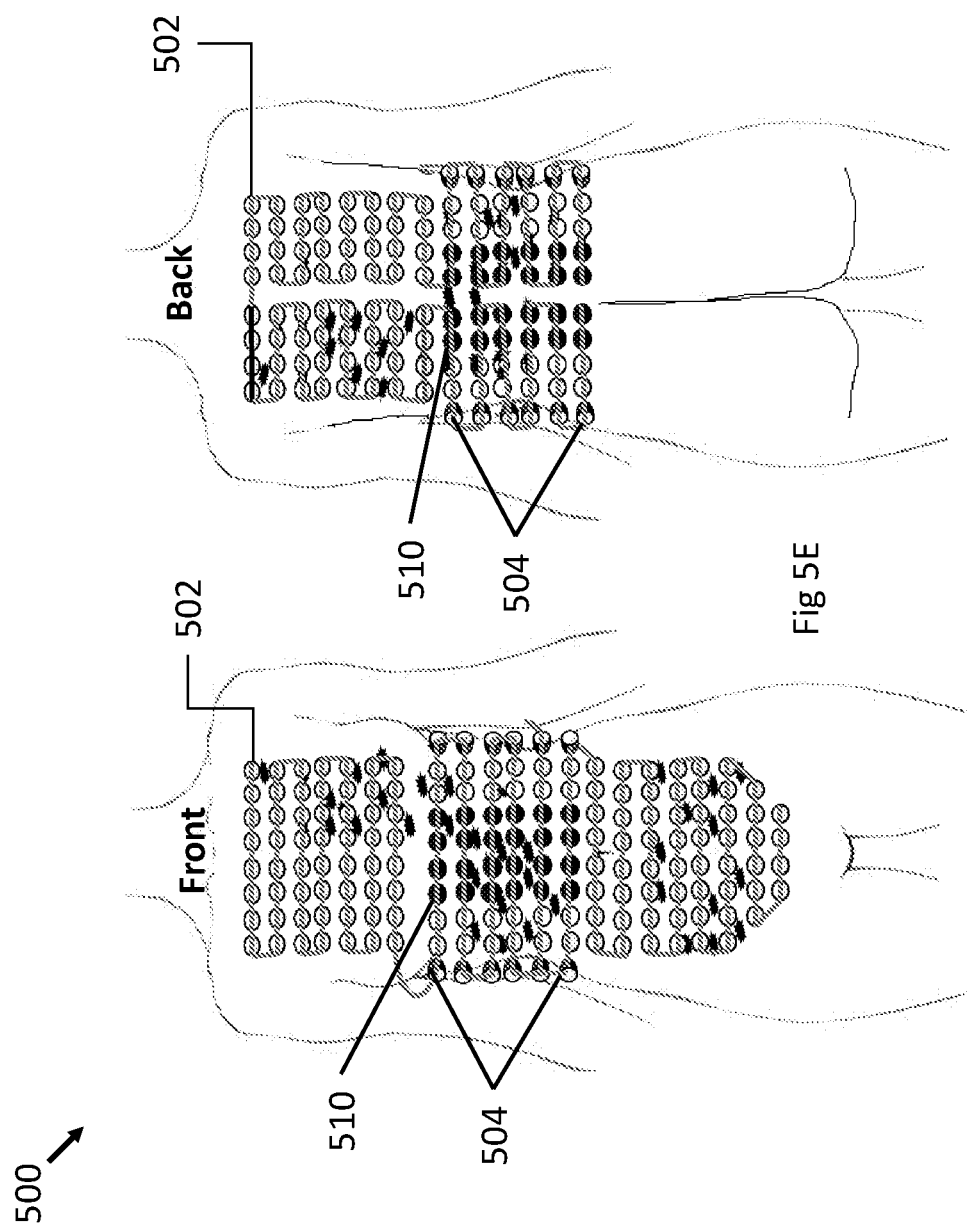
FIG. 5E illustrates a subarray pair firing front to back.
Figure 5F:
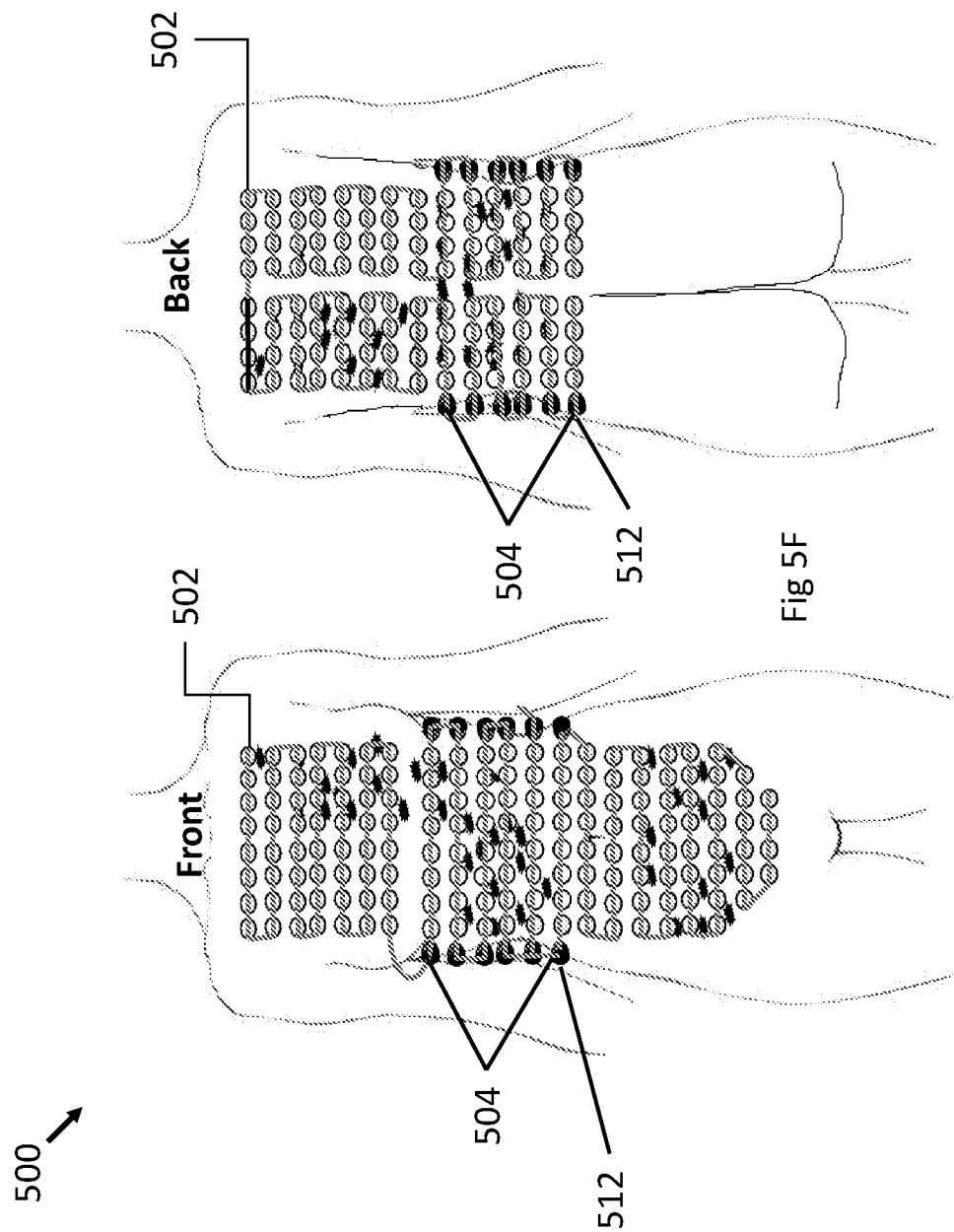
FIG. 5F illustrates a subarray firing side to side.

To illustrate the above embodiment FIG. 5A shows the present invention on a patient, complete with front and back arrays 502, and side arrays 504 ready for dividing into sub arrays to deliver TTF therapy. The location of diffuse tumors 514 is also represented. FIG. 5B shows a selected subarray pair 506 firing (darkened disks, representing individual electrodes of the subarray pairs) diagonally through a tumor area left front to right back. FIG. 5C shows the introduction of a NNTTF for a duration of less than 3 seconds, no array elements are activated (the darkened disks of FIG. 5B being blank in FIG. 5C). FIG. 5D shows a selected subarray pair 508 firing diagonally through a tumor area right front to left back. FIG. 5E shows a selected subarray pair 510 firing front to back. FIG. 5F shows a selected subarray pair 512 firing side to side. FIG. 5G shows the introduction of a NNTTF for a duration of less than 3 seconds, no array elements are activated. The cycle then repeats as controlled by the controller of the TTF system. In commercially available prior art systems the tumor area treated, for example the area treated in FIGS. 5B-5G would be treated with fixed arrays on 50% duty cycle until reactive heat shutoffs would occur. These reactive shutoffs of the prior-art systems are longer then 3 seconds, which reduces therapy efficacy. The method of the present invention, illustrated in FIGS. 5B-5G show a series of firings with the introduction of the NNTTFs reducing the duty cycle of each array element to less than 17%, thereby reducing the likelihood of heat buildup without losing treatment efficacy.

Figure 2A:
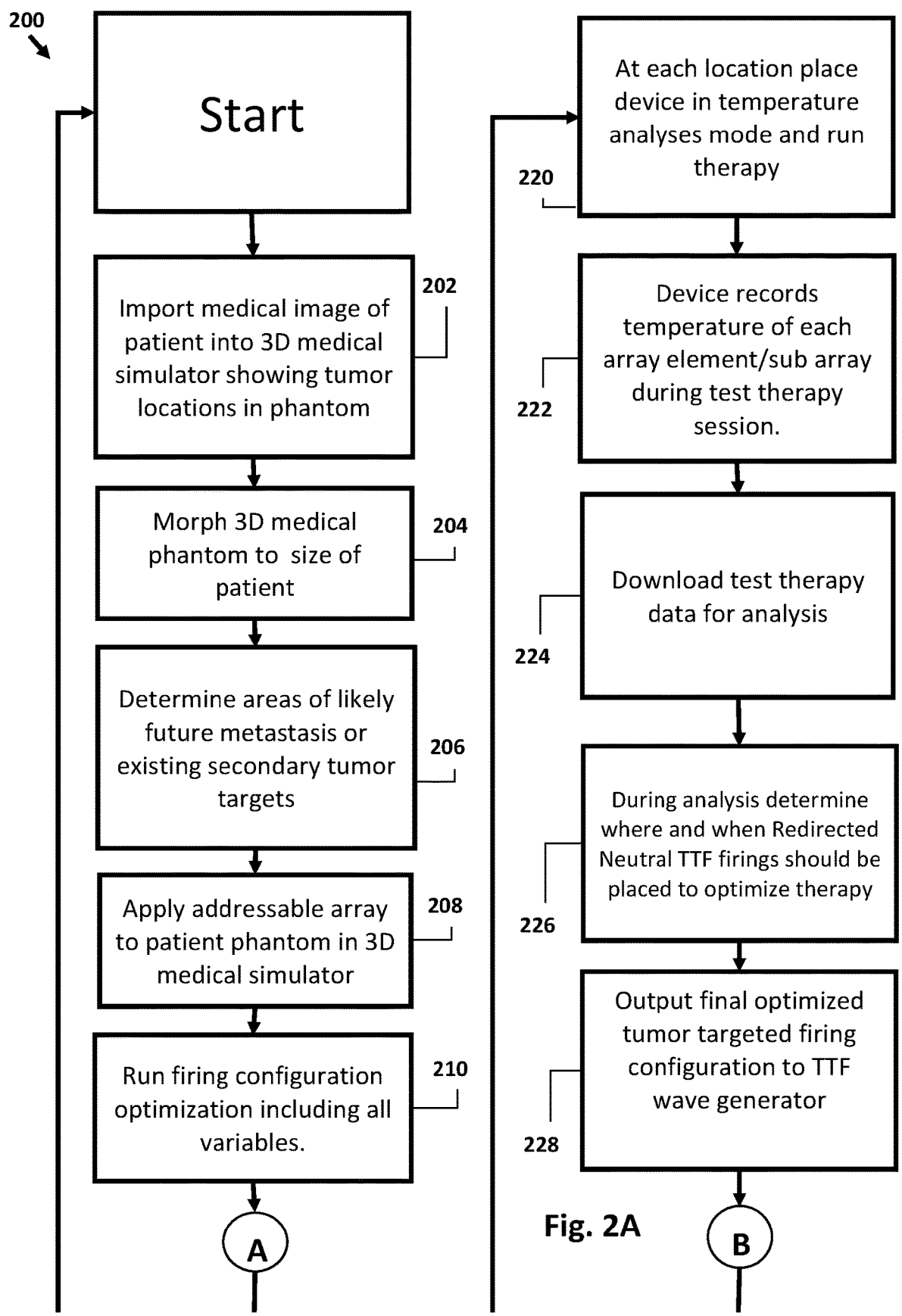
FIG. 2A is the first page of a flowchart illustrating an embodiment of a treatment method of the present invention introducing the implementation of Redirected Neutral TTFs (RNTTFs)
Figure 2B:
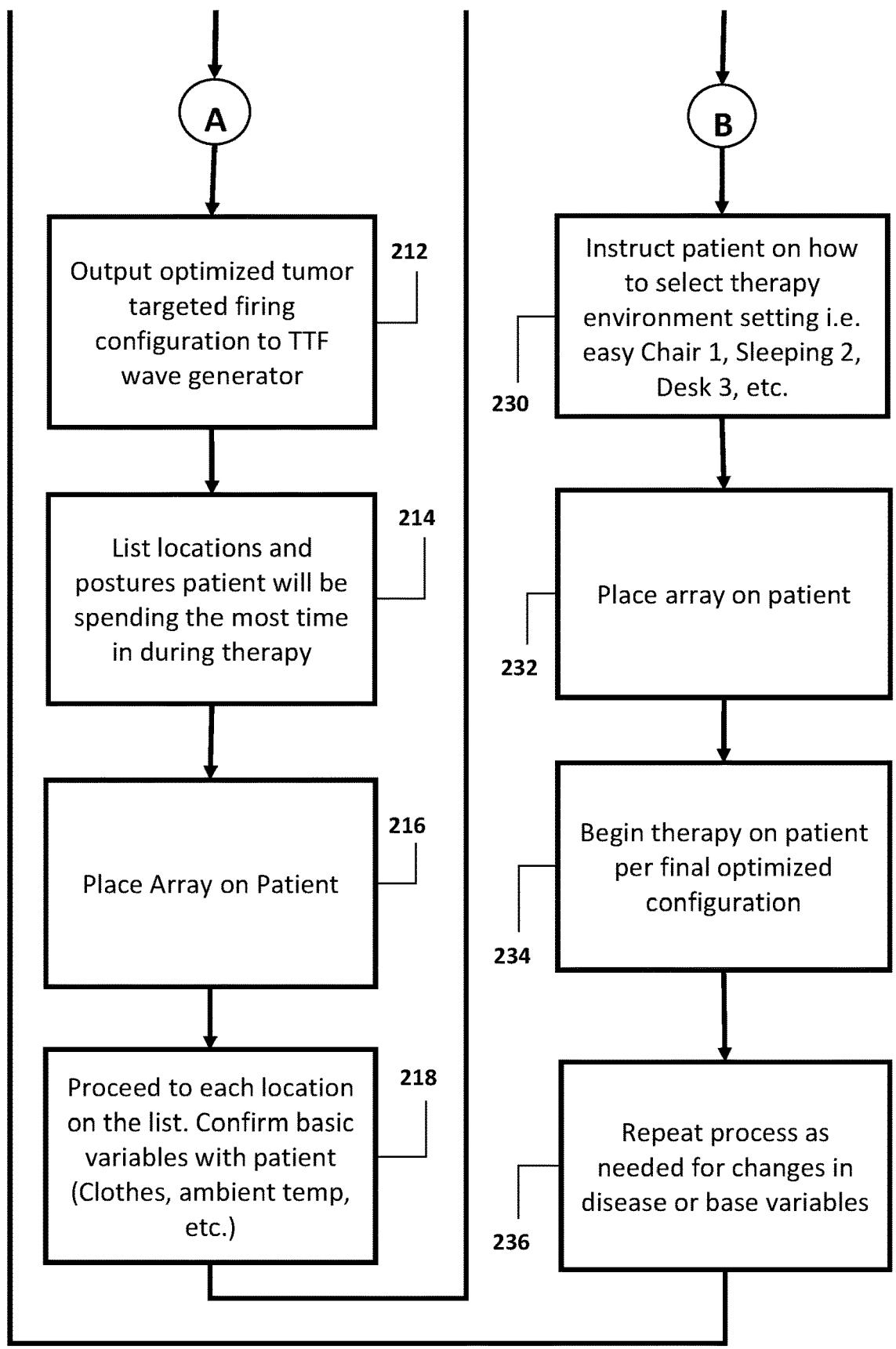
FIG. 2B is the second page of the flowchart of FIG. 2A.
Figure 3:
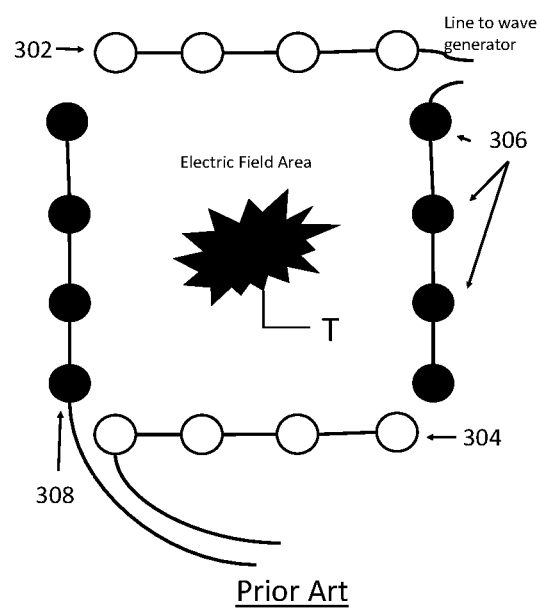
FIG. 3A illustrates a firing of array elements of prior art systems.
FIG. 3B illustrates a firing of another pair of array elements by a prior art system.
Figure 3:
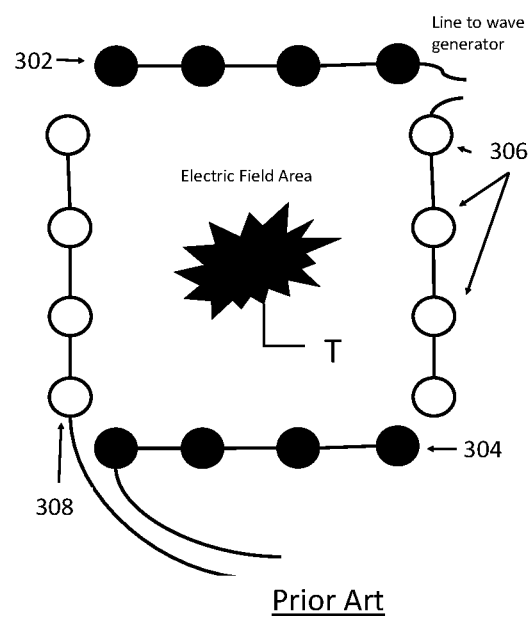
Figure 4A:
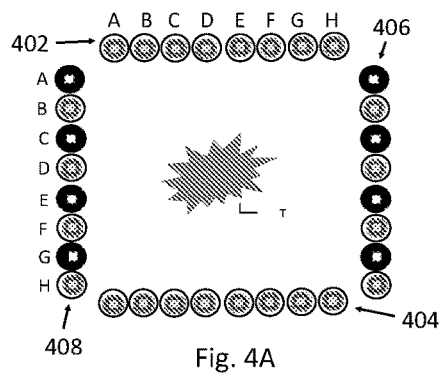
FIG. 4A illustrates a firing of individual programmable array elements of an array of elements to treat a tumor in a patient of the present invention, using the method of FIGS. 1A and 1B.
Figure 4B:
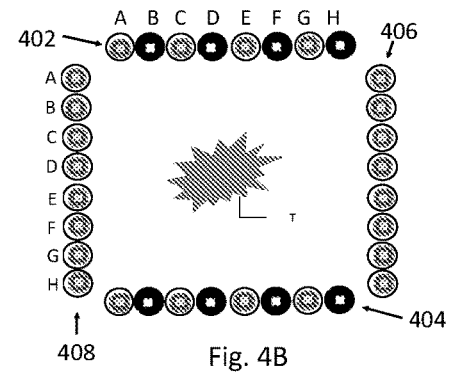
FIG. 4B illustrates a firing of other individual programmable array elements of the array of elements of FIG. 4A.
Figure 4C:
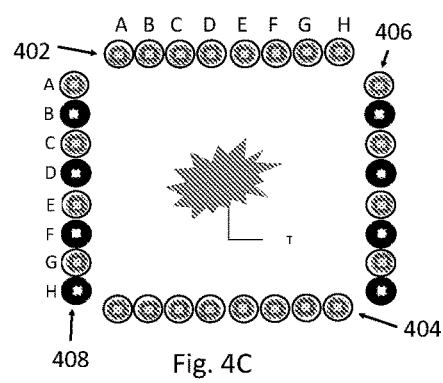
FIG. 4C illustrates a firing of still other individual programmable array elements of the array of elements of FIGS. 4A and 4B.
Figure 4D:
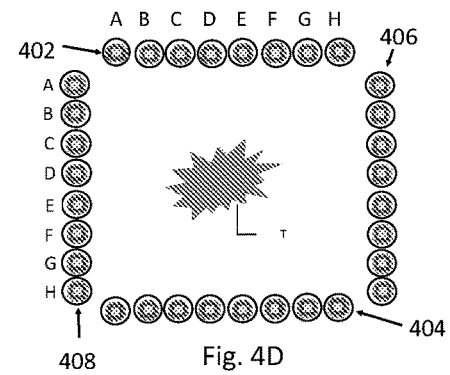
FIG. 4D introducing a NNTTF into the firing sequence.
Figure 4E:
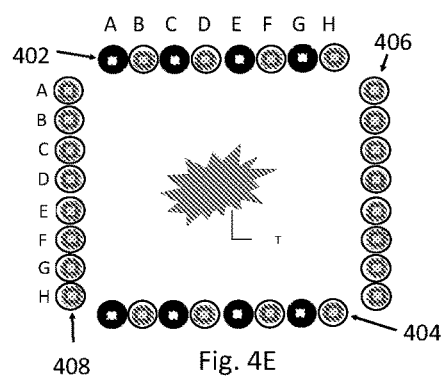
FIG. 4E illustrates a firing of yet still other individual programmable array elements of the array of elements of FIG. 4A-4D.

Now, additionally referring to FIGS. 2A and 2B there is illustrated an embodiment of a treatment method 200 of the present invention. As previously mentioned, one important step in administering tumor treating fields (TTFs) of the present invention is delivering electric fields to target multiple tumors in the human body. The present invention uses a process for optimizing the placement of array elements on the body as well as an optimal firing sequence for the array elements, to take advantage of the placement of the elements. First, at step 202, a medical image of a patient's tumor location(s) is imported into a medical simulator like Sim4life. These medical simulators have phantoms or avatars that meet general body types of most of the population. The phantoms are 3-D virtual bodies with all tissue types and organs simulating the human anatomy. An appropriate 3-D phantom is selected to match the size of the patient. The phantom is morphed to match the physical description of the patient, at step 204. At step 206, the process of determining areas of likely future metastasis or existing secondary tumor targets is undertaken. Within the medical simulator a representation of the present invention is placed on the phantom, at step 208. This completes preparation for a medical simulation with the phantom accurately representing the location of the patient's tumors and the present inventions electrical attributes e.g., dielectric constant, power levels, etc. At step 210, a simulated firing algorithm is run, analyzing which sequence or combination of array elements optimally treats the tumors in the simulation. The behavior of electric fields from the TTF is simulated through the body tissues and organs to evaluate the effectiveness of the applied electromagnetic fields and to optimize the firing sequences. This includes the optimum number of sub array pairs, number of different angles they fire from and power levels. The results of the optimal firing sequence are then exported to the patient's wave generator, at step 212. At step 214, the patient's daily habits are discovered through an interview. Those locations where a patient will be spending the most time while under therapy are identified and listed, e.g., easy chair, sleeping, work desk, etc. At step 216, the present invention is placed on the patient in the manner recommended by the medical simulation and/or doctor's input. At step 218, the process of proceeding to each therapy location is begun. At each location basic variables related to temperature are gathered and recorded, e.g., likely clothing worn, ambient temperature, posture, air flow, etc. Step 220 requires going to each therapy location, placing the device in temperature analysis mode and running a therapy session. At step 222, during the temperature test therapy sessions, the device records the temperature of each array element and its sub array. The data from each test therapy session is downloaded for analysis at step 224. During analysis step 226 the determination of when to insert Redirected Neutral TTFs (RNTTFs) is made as well as where to target them, either into preventative target areas or existing secondary tumors. This method prevents temperature build up and optimizes therapy. This is done for each therapy location for each patient. The optimized firing configuration with RNTTFs is downloaded into the wave generator at step 228. The patient is instructed, at step 230, on how to select the therapy environment setting, e.g., press 1 for easy chair, press 2 for sleeping, press 3 for sitting at desk, etc. The master array is then placed on the patient, at step 232, and the patient begins personalized optimal therapy, at step 234. When needed the process is repeated (step 236) for changes in body shape from losing or gaining of weight, the development of new or the decline of existing tumors or changes in the environment.

Figure 6F:
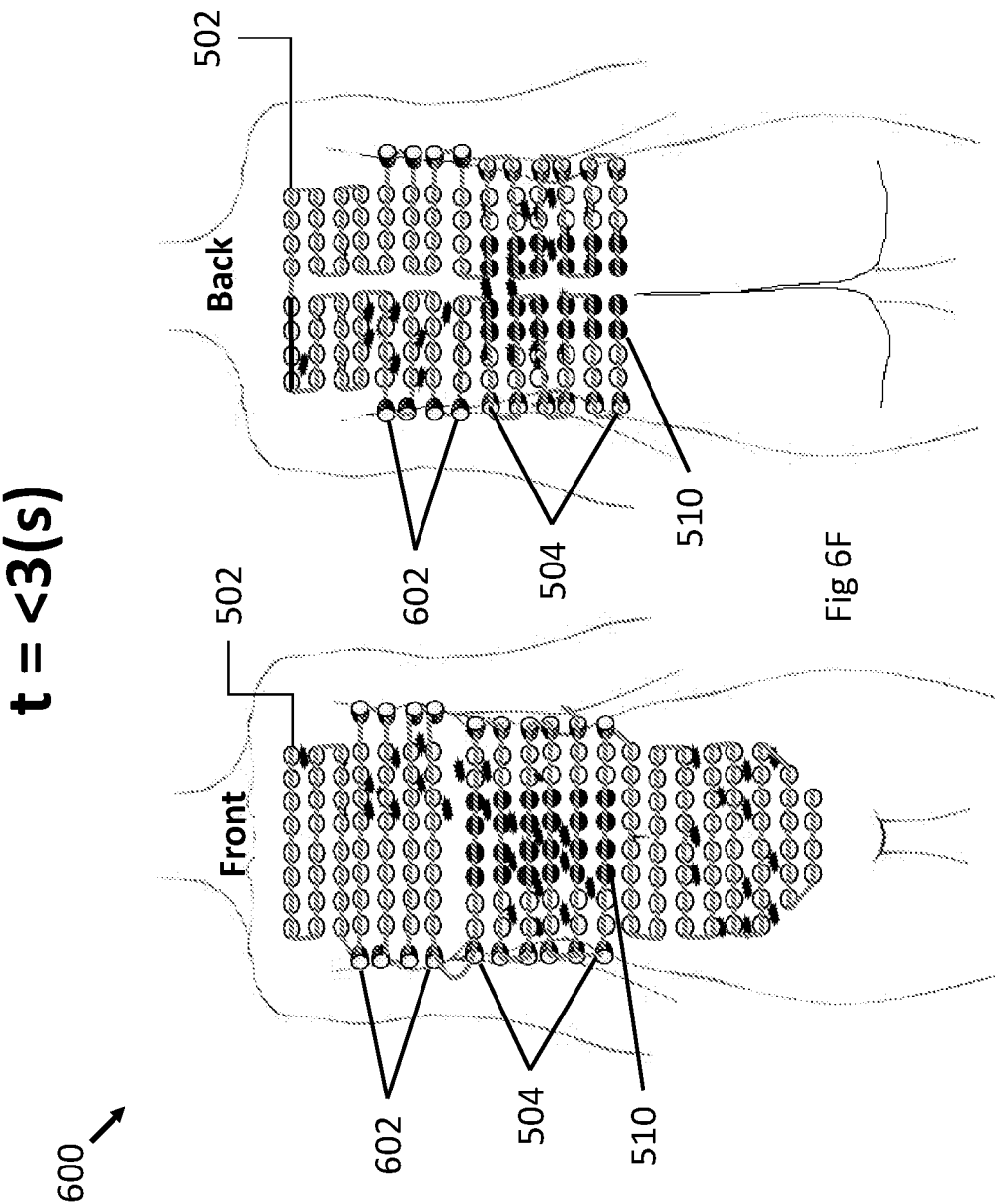
FIG. 6F illustrates a subarray pair firing front to back for less than 3 seconds.

To illustrate the above embodiment FIG. 6A shows the present invention on a patient, complete with front and back arrays 502 and side arrays 504 ready for dividing into sub arrays to deliver TTF therapy. In addition, side array elements 602 in the lung area are shown. The location of diffuse tumors 514 is also represented. FIG. 6B shows a selected subarray pair 506 firing diagonally through a tumor area over the liver and stomach left front to right back, for a period of less than 3 seconds. FIG. 6C shows the introduction of a RNTTF for a duration of less than 3 seconds, firing on a tumor group over the left lung, left front to mid back utilizing electrodes 604, for less than 3 seconds. FIG. 6D shows a selected subarray pair 508 firing diagonally though the liver/stomach tumor area right front to left back, for less than 3 seconds. FIG. 6E shows a RNTTF selected subarray pair 606 firing diagonally over the left lung mid front left to left back, for a period of less than 3 seconds. FIG. 6F shows a selected subarray pair 510 firing front to back over the liver/stomach area, for less than 3 seconds. FIG. 6G shows the introduction of a NNTTF side to side over the lungs 608, for a duration of less than 3 seconds. The cycle, or at least selected portions, repeat as directed by the TTF system.

In prior art systems, the tumor area represented in FIGS. 6B-6G would be treated with fixed arrays on 50% duty cycles until reactive heat shutdowns would occur. This would be over the liver stomach area only, as fixed array systems are not able to handle diffuse disease adequately over different areas like the lung and liver simultaneously. Reactive shutoffs are longer than 3 seconds, which reduces therapy efficacy. The present invention as discussed herein and illustrated in FIGS. 6B-6G show a series of firings with the introduction of the RNTTFs reducing the duty cycle of each array element to less than 17%, thereby reducing the likelihood of heat buildup in the electrode arrays. All while treating 2 distinct tumor areas. Please note, in the example shown in FIGS. 6B-6G all primary firings and RNTTFs are for a duration of less than 3 seconds. This allows an effective TTF to be delivered to both tumor areas 100% of the time with the reduced array duty cycle.

Figure 7:
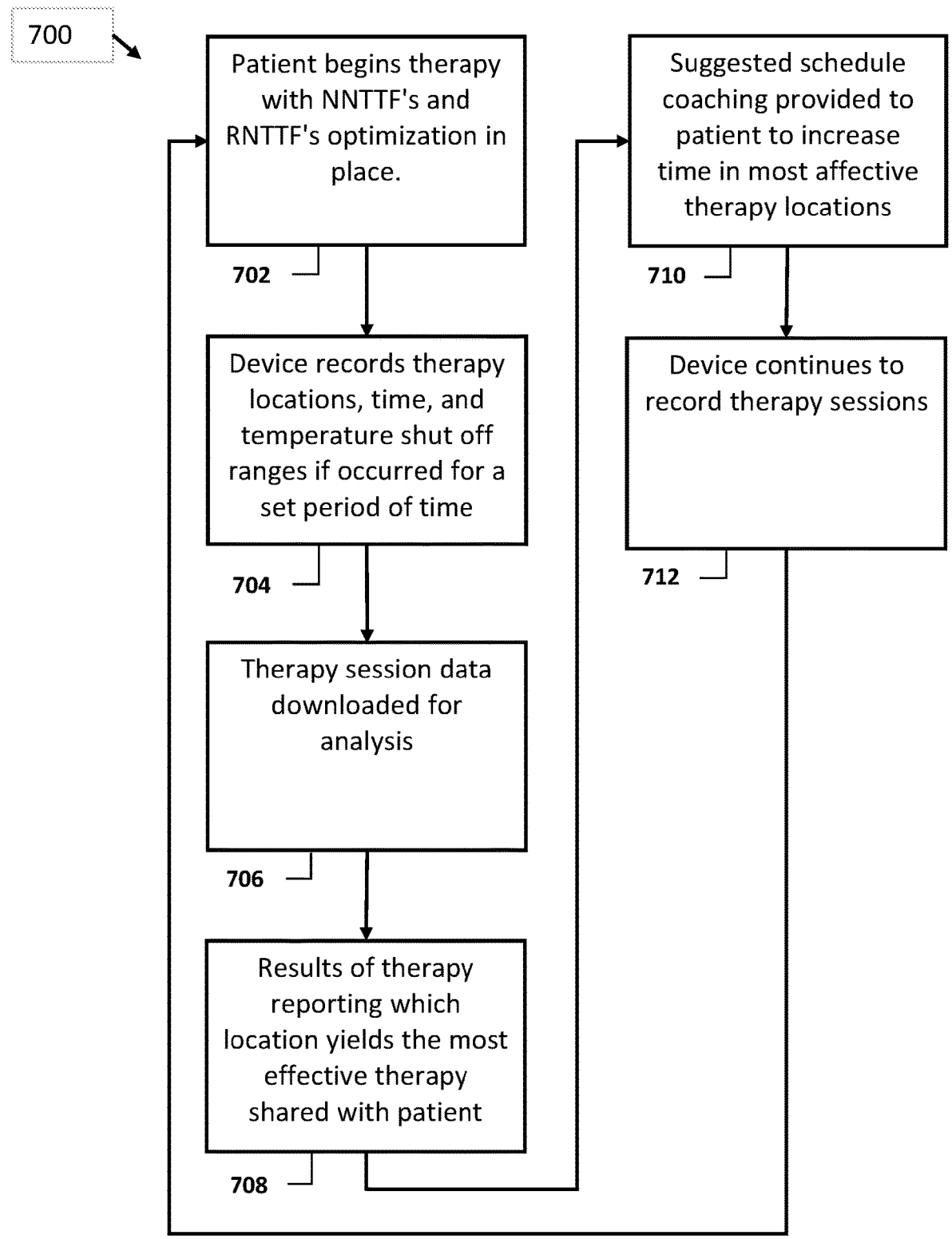
FIG. 7 is a flowchart illustrating an embodiment of a treatment method of the present invention that enables patients to increase the efficacy of their own therapy by providing feedback on daily behaviors.

Now, additionally referring to FIG. 7 there is illustrated an embodiment of a treatment method 700 of the present invention that enables the patient to improve the efficacy of their own treatment through informative therapy feedback. The patient begins therapy with NNTTFs and RNTTFs optimization at step 702. The present invention records, at step 704, therapy locations, times, duration, temperature shut off, (if optimization fails to prevent temperatures rising above cut off limits), intensity verification, etc. After a set period of time the therapy session data of the patient is downloaded for analysis at step 706. After analysis, a report is prepared for the patient revealing which locations and times yielded the most effective therapy at step 708. Coaching is provided to the patient suggesting habits that can increase therapy efficacy based on previous sessions at step 710. The device continues recording therapy sessions and the process repeats at step 712.

Figure 8A:
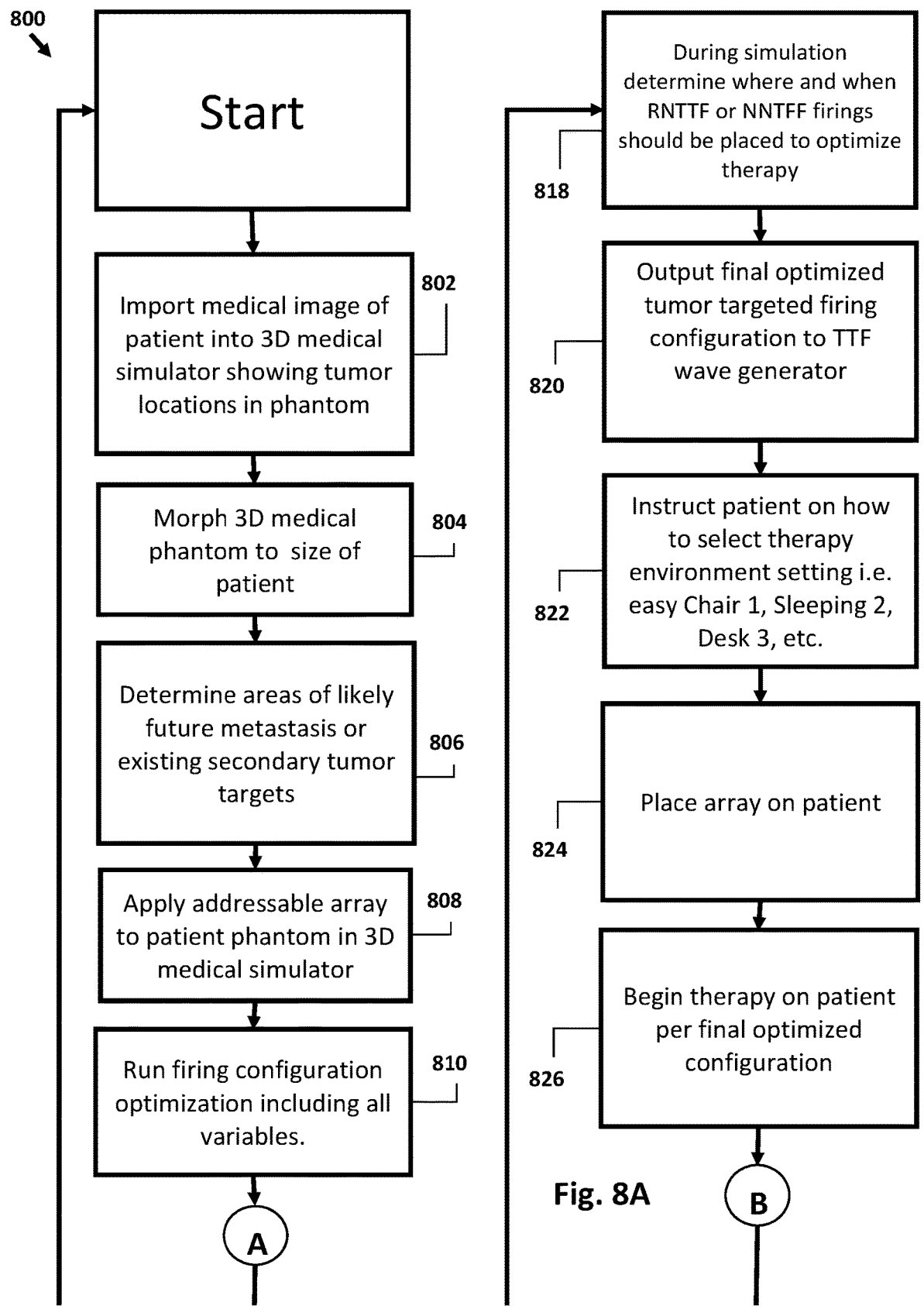
FIG. 8A is the first page of a flow chart illustrating the embodiment of a treatment method of the present invention that achieves the placement of NNTFFs and RNTFFs through personalized simulations of location specific therapy sessions, rather than actual test therapy sessions.
Figure 8B:
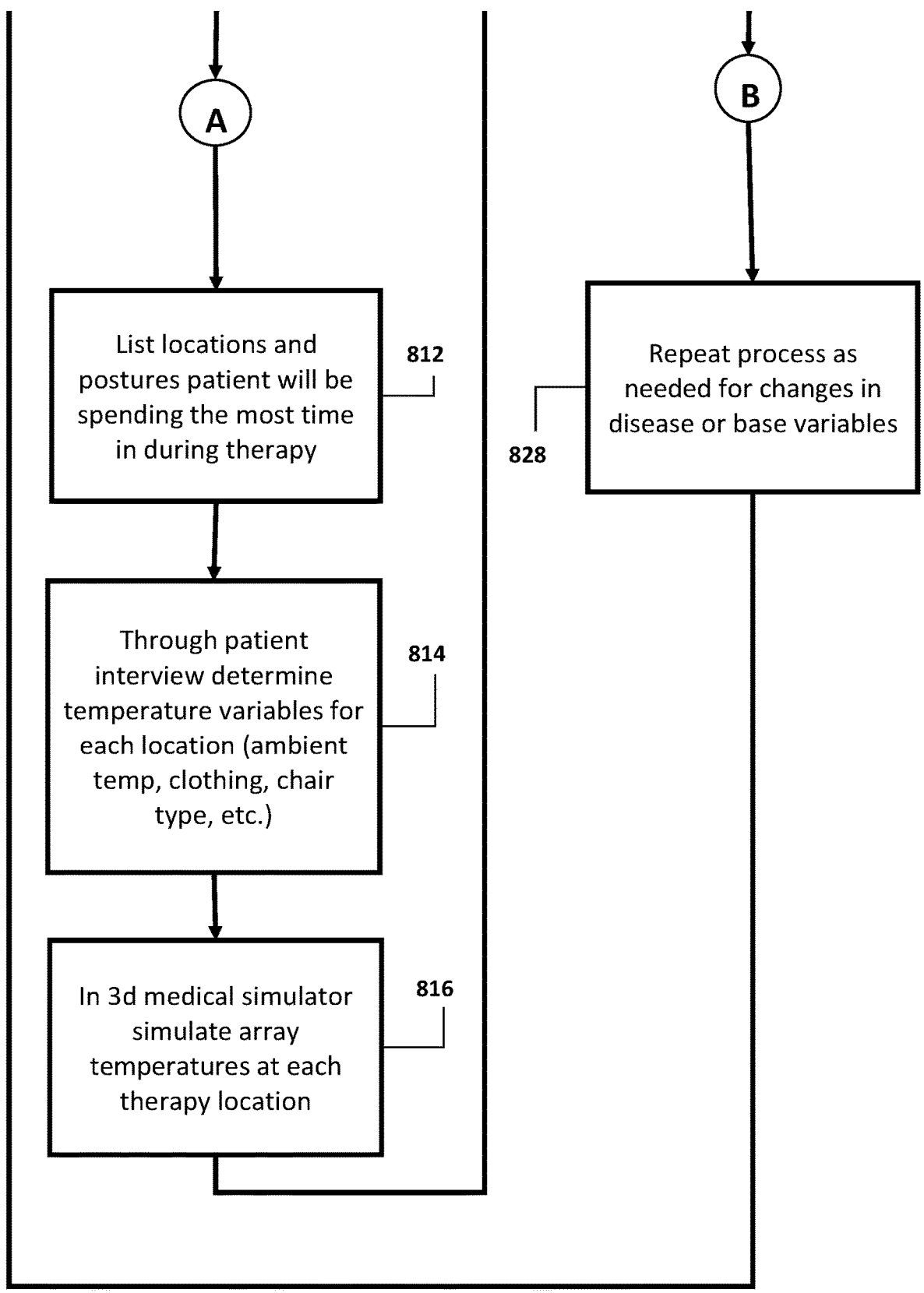
FIG. 8B is the second page of the flow chart of FIG. 8A.

Now, additionally referring to FIG. 8 there is illustrated an embodiment of a treatment method 800 of the present invention for preparing to treat a patient. As previously mentioned, one important step in administering tumor treating fields (TTF) is positioning electric fields to target multiple tumors in the human body. The present invention uses a process for optimizing the placement of array elements on the body as well as an optimal firing sequence for the array elements, to take advantage of the placement of the elements. First at step 802, a medical image of a patient's tumor location(s) is imported into a medical simulator like Sim4life. These medical simulators have phantoms or avatars that meet general body types of most of the population. The phantoms are 3-D bodies with all tissue types and organs simulating the human anatomy. An appropriate 3-D phantom is selected to match the size of the patient. The phantom is morphed to match the physical description of the patient at step 804. Step 806 is the process of determining areas of likely future metastasis or existing secondary tumor targets. Within the medical simulator a representation of the arrays of the present invention are placed on the phantom at step 808. This completes preparation for a medical simulation with the phantom accurately representing the location of the tumors and the present inventions electrical attributes e.g., dielectric constant, power levels, etc. At step 810, a simulated firing algorithm is run, analyzing which sequence or combination of array elements optimally treats the tumors in the simulation. The behavior of electric fields from the TTF is simulated through the body tissues and organs to evaluate the effectiveness of the applied electromagnetic fields and to optimize the firing sequences. This includes the optimum number of sub array pairs, number of different angles they fire from and power levels. A list of postures and locations that the patient will be spending the most time during therapy is built, e.g., easy chair, bed, etc. at step 812. Through patient interviews the temperature variables for each location (ambient temp, clothing, air circulation, chair type, etc.) are gathered and recorded, at step 814. At step 816 a simulation of TTF therapy at each location is performed including the temperature of each array element and sub array. During the location simulations a determination is made on where and when to introduce RNTTFs and NNTTFs to optimize therapy (see step 818). This is done for each therapy location for the patient. The optimized firing configuration with RNTTFs is downloaded into the wave generator at step 820. The patient is instructed (see step 822) on how to select the therapy environment setting, e.g., press 1 for easy chair, press 2 for sleeping, press 3 for sitting at desk, etc. The master array is then placed on the patient, at step 824, and the patient begins personalized optimal therapy at step 826. When needed the process is repeated (step 828) for changes in body shape from losing or gaining of weight, the development of new or the decline of existing tumors or changes in environment.

Use of the term "array" herein has taken different meanings, dependent upon context. In one sense when talking about the grouping of electrodes on the body it is broadly referring to the physical rows and columns of the electrodes, or at least their placement, whether in rows and columns or not. The arrays that are used in forming electromagnetic fields that are dynamically selected so that the desired field can be generated, and this means a subset of the electrodes that may or may not be adjacent are selected and used.

It is further contemplated that the invention can be in the form of an apparatus for delivering a plurality of electromagnetic fields to a body of an individual. The apparatus includes a plurality of electrode elements configured for being located on the body of the individual. The apparatus may also include a support material configured for holding the plurality of electrode elements relative to the body of the individual. The apparatus also includes a control device coupled with the plurality of electrode elements. The control device is configured to detect temperatures of the plurality of electrode elements, determine alternate firing sequences of the plurality of electrode elements, and implement the determined alternate firing sequences for delivering the plurality of electromagnetic fields for treating tumors in the body of the individual and reducing temperatures of the plurality of electrode elements.

The invention in another form is directed to a method for delivering a plurality of electromagnetic fields to a body of an individual. The method includes the steps of discovering the optimal number of angles a TTField can be delivered through a tumor area. The further steps of introducing one, or as many as are needed, what we call personalized Neutral Non TTFs (NNTTFs) into the firing configuration to preemptively keep array temperatures below uncomfortable and safety cut off ranges. NNTTFs are brief pauses in therapy that do not affect efficacy. It is well established in TTF research that brief pauses in TTF therapy do not reduce its efficacy. These pauses have been shown to be usually less than 3 seconds in preclinical research. Based on this research we limit NNTTFs to 3 seconds, or preferably less. These short pauses (NNTTFs) do not affect therapy because the TTField immediately before the introduction of the NNTTF disrupts the function of the dipole particles in the cell needed for mitosis to occur in cancer cells (i.e. tubulin or septin). The short NNTTF pauses after a therapeutic TTField is applied are not long enough for the dipoles to reorganize as long as the next TTField is applied in under 3 seconds. In other words, the NNTTF is so short that the next TTField disrupts the dipole particles again before they have time to reorganize or recover. Thus, the word neutral refers to a pause of TTF therapy of short enough duration that it does not affect efficacy. The method further includes the steps of personalizing the introduction of NNTTFs based on individual patient temperature and situational variables such as clothing, ambient temperature, posture, etc.

The method also includes the step of determining alternate firing sequences of the plurality of electrode elements. The method also includes the step of implementing the determined alternate firing sequences for delivering the plurality of tumor treating electromagnetic fields and to preemptively control temperatures of the plurality of electrode elements.

The invention in another form is directed to a method for delivering a plurality of electromagnetic fields to a body of an individual. The method includes the steps of determining the optimal number of angles a TTField can be delivered through a tumor area. The further steps of introducing personalized, Redirected Neutral TTFs (RNTTFs) into the firing configuration to preemptively keep array temperatures below uncomfortable and cut off ranges over the primary tumor area. RNTTFs differ from NNTTFs in that they introduce pauses over the primary tumor target area, but not pauses in therapy. Instead, they redirect an active TTF firing from the primary tumor area to an area statistically likely to develop further metastatic disease or to an area that already has disease outside the original target area. For example, TTF therapy over a primary tumor area of colorectal cancer may require a NNTTF to preemptively keep temperatures low, but instead of pausing the firing, the present invention redirects a firing to the liver for the same duration as a NNTTF. This creates the RNTTF. Available statistical databases indicate the liver is a likely place for colorectal cancer to spread and often already has disease. As previously stated, it is well established in TTF research that brief pauses in TTF therapy do not reduce its efficacy. These have been shown to be usually less than 3 second pauses in preclinical research. For human use in our device, we limit NNTTFs and RNTTFs to 3 seconds or preferably less. These short pauses do not affect therapy because the TTField immediately before the introduction of the NNTTF or RNTTF disrupts the dipole particle alignment needed for mitosis to occur in cancer cells (i.e. tubulin or septin). The short NNTTF or RNTTF pauses afterward, are not long enough for the dipole particles to recover. In other words, the NNTTF or RNTTF is so short the next TTField disrupts the dipole particles again before they can reorganize. The method further includes the steps of personalizing the introduction of RNTTFs based on individual patient temperature and situation variables such as clothing, ambient temperature, posture, etc. The introduction of a RNTTF can add preventive therapy to the patient while achieving the preemptive temperature control of the array elements over the primary tumor area. Or an RNTTF can simultaneously treat any $2^{nd}$ tumor area using different array elements.

The method of treating tumors include the steps of placing an electrode array on the patient; running a temperature analysis mode of the electrode array to provide a temperature analysis; determining which subarrays of the electrode array have therapeutically neutral non tumor treating field (NNTTF) firings inserted into a firing configuration based on the temperature analysis (therapeutically neutral because the amount time the neutral non tumor treating field firings occur are so short, the tubulin do not have time to recover from the interruption before a live firing occurs again, therapy overall efficacy is not affected, but duty cycle is lowered producing less heat); and treating the patient using the firing configuration to deliver tumor treating fields to the patient.

The method of treating tumors by the delivery of tumor treating electric fields to a patient, can also be viewed as having the steps of: placing a virtual electrode array on a patient phantom; running a virtual temperature analysis of the virtual electrode array to provide a temperature analysis; determining which subarrays of the virtual electrode array have therapeutically neutral non tumor treating field (NNTTF) firings and/or redirected neutral tumor treating field (RNTTF) firings inserted into a firing configuration based on the temperature analysis; and treating the patient using the firing configuration to deliver tumor treating fields to the patient.

Further, the method of treating tumors by the delivery of tumor treating electric fields to a patient can include the steps of: importing a medical image of the patient into a medical simulator; placing a virtual electrode array on a patient phantom of the simulator; running a virtual temperature analysis of the virtual electrode array to provide a temperature analysis; determining which subarrays of the virtual electrode array have therapeutically neutral non tumor treating field firings and/or redirected neutral tumor treating field firings inserted into a firing configuration based on the temperature analysis; applying an electrode array to the patient; and treating the patient using the firing configuration to deliver tumor treating fields to the patient.

The method also includes the step of determining alternate firing sequences of the plurality of electrode elements. The method also includes the step of implementing the determined alternate firing sequences for delivering the plurality of tumor treating electromagnetic fields and to preemptively control temperatures of the plurality of electrode elements.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of treating tumors by the delivery of tumor treating electric fields to a patient, comprising the steps of:
   placing an electrode array on the patient;
   running an environmental analysis mode of the electrode array to provide an environmental analysis;
   determining which subarrays of the electrode array will have no electrodes being fired for a duration of less than 3 seconds inserted into a firing configuration based on the environmental analysis;
   selecting a therapy environmental setting, the environmental setting being that the patient is sitting or lying down, the determining step being additionally dependent upon the environment setting in that the firing configuration is altered by the environmental setting of the patient, wherein the environmental setting of sitting or lying down alters the firing configuration by shifting firing of the electrodes from those electrodes in proximity to a surface of a bed or a chair; and
   treating the patient using the firing configuration to deliver tumor treating fields to the patient.

2. The method of claim 1, further comprising the step of applying a virtual array to a patient phantom in a medical simulator to evaluate a positioning of virtual electrodes in the virtual array to determine where elements of the electrode array are placed in the placing step.

3. The method of claim 1, further comprising the steps of:
   placing a virtual electrode array on a patient phantom;
   running a virtual temperature analysis of the virtual electrode array to provide a temperature analysis, the analysis being done for all environmental settings; and
   determining which subarrays of the virtual electrode array are used in an electrode firing configuration based on the temperature analysis for each environmental setting.

4. The method of claim 1, wherein the therapy environmental setting is selected by the patient.

5. The method of claim 1, further comprising the step of removing the condition of electrodes not being fired for a duration of less than 3 seconds previously inserted into the tumor treating field firings of the firing configuration.

6. The method of claim 1, wherein the determining step is repeated to determine a different subarray in which there are no electrodes being fired for a duration of less than 3 seconds.

7. The method of claim 6, further comprising the steps of importing a medical image of the patient into a medical simulator; and
   placing a virtual electrode array on a patient phantom of the simulator.

8. The method of claim 7, wherein the environmental analysis is a virtual temperature analysis of the virtual electrode array with the virtual temperature analysis being used by the determining step to determine which subarrays of the electrode array will have no electrodes being fired for a duration of less than 3 seconds inserted into the firing configuration.

9. The method of claim 1, wherein the determining step further includes selecting an other subarray of the electrode array to add to the firing configuration to treat the tumors.

* * * * *